United States Patent
Pedersen et al.

(10) Patent No.: US 7,667,637 B2
(45) Date of Patent: Feb. 23, 2010

(54) SYSTEM AND METHOD FOR RADAR DETECTION OF AN OBJECT

(75) Inventors: Peder Richardt Pedersen, Horsholm (DK); Fernando Casanova Galeano, Copenhagen S (DK)

(73) Assignee: Weibel Scientific A/S (DK)

(*) Notice: Subject to any disclaimer, the term of this patent is extended or adjusted under 35 U.S.C. 154(b) by 402 days.

(21) Appl. No.: 10/599,645
(22) PCT Filed: Apr. 5, 2005
(86) PCT No.: PCT/DK2005/000230

§ 371 (c)(1),
(2), (4) Date: Oct. 4, 2006

(87) PCT Pub. No.: WO2005/098471

PCT Pub. Date: Oct. 20, 2005

(65) Prior Publication Data

US 2008/0272956 A1 Nov. 6, 2008

(30) Foreign Application Priority Data

Apr. 5, 2004 (DK) ............................. 2004 00554

(51) Int. Cl.
G01S 13/58 (2006.01)
G01S 13/42 (2006.01)
G01S 13/34 (2006.01)
G01S 13/36 (2006.01)
G01S 13/00 (2006.01)

(52) U.S. Cl. .................. 342/107; 342/104; 342/105; 342/118; 342/127; 342/128; 342/129; 342/130; 342/146; 342/147; 342/175; 342/192; 342/195; 342/196

(58) Field of Classification Search ............ 342/27, 342/28, 59, 82–103, 118, 128–133, 175, 342/192–197, 450–465, 104–116, 120, 122, 342/165, 173, 174, 126, 127, 146–158, 70–72

See application file for complete search history.

(56) References Cited

U.S. PATENT DOCUMENTS 3,120,659 A 10/1961 Wells et al.
(Continued)

FOREIGN PATENT DOCUMENTS

EP 0 403 085 12/1990
(Continued)

*Primary Examiner*—Bernarr E Gregory
(74) *Attorney, Agent, or Firm*—Gifford, Krass, Sprinkle, Anderson & Citkowski, P.C.

(57) ABSTRACT

There is provided a radar system for detection of one or more objects. The radar system comprises a radar wave transmitter for simultaneously transmitting a CW radar signal and a FM-CW or MF radar signal, and a first radar wave receiver for receiving CW and FM-CW or MF radar signals, reflected from one or more objects present in a detection range of the radar system. The system may further comprise a first CW mixer for mixing CW transmission signals and reflected CW signals received by the first receiver, and a first FM-CW or MF mixer for mixing FM-CW or MF transmission signals and corresponding reflected FM-CW or MF signals received by the first receiver. The first CW mixer may be a mixer for mixing CW transmission signals and reflected CW signals received by the first receiver to produce one or more first CW beat signals, each first CW beat signal relating to the velocity of an object, and the first FM-CW or MF mixer may be a first FM-CW mixer for mixing FM-CW transmission signals and reflected FM-CW signals received by the first receiver to produce one or more first FM-CW beat signals relating to the distance to and the velocity of an object. The radar wave transmitter may be adapted for simultaneously transmitting a CW radar signal and a FM-CW radar signal, wherein the FM-CW radar signal is a ramp modulated signal. The radar system may further comprise several radar wave receivers for receiving reflected CW and FM-CW or MF radar signals, which receivers may be arranged along first and/or second receiver directions. The radar system may have means for detecting phase differences between corresponding reflected radar signals received by different radar wave receivers. There is further provided a method of radar detection of one or more objects, where the method comprises simultaneously transmitting a CW radar signal and a FM-CW or MF radar signal, and receiving, via a first radar receiver, reflected CW and FM-CW or MF radar signals reflected from one or more object present in a detection range of the radar system.

25 Claims, 11 Drawing Sheets

U.S. PATENT DOCUMENTS

| | | | |
|---|---|---|---|
| 3,161,870 A | * 12/1964 | Pincoffs | 342/59 |
| 3,184,739 A | * 5/1965 | Franklin et al. | 342/451 |
| 3,611,370 A | * 10/1971 | Frasure et al. | 342/82 |
| 4,115,774 A | * 9/1978 | Tresselt | 342/174 |
| 4,241,347 A | 12/1980 | Albanese et al. | |
| 5,325,097 A | 6/1994 | Zhang et al. | |
| 5,345,470 A | * 9/1994 | Alexander | 342/101 |
| 5,625,362 A | 4/1997 | Richardson et al. | |
| 5,731,778 A | 3/1998 | Nakatani et al. | |
| 5,973,636 A | 10/1999 | Okubo et al. | |
| 6,097,331 A | 8/2000 | Matsugatani et al. | |
| 6,104,336 A | 8/2000 | Curran et al. | |
| 6,426,717 B1 | * 7/2002 | Maloratsky | 342/122 |
| 6,492,938 B1 | 12/2002 | Alland | |
| 2002/0190893 A1 | 12/2002 | Akasu | |
| 2003/0122702 A1 | 7/2003 | Kishida et al. | |

FOREIGN PATENT DOCUMENTS

| | | |
|---|---|---|
| EP | 627 634 | 12/1994 |
| EP | 0 766 100 | 4/1997 |
| EP | 0 913 705 | 5/1999 |
| EP | 0 947 852 | 10/1999 |
| GB | 2 380 682 | 4/2003 |
| NL | 1011782 | 12/2000 |

* cited by examiner

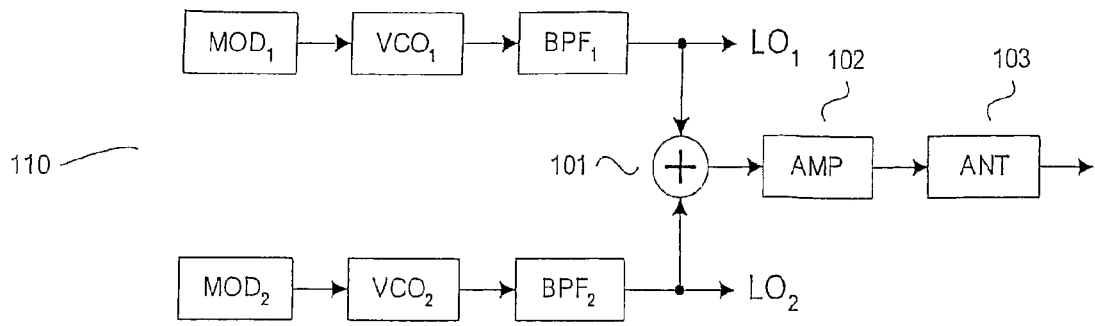
Fig. 1a Transmitter
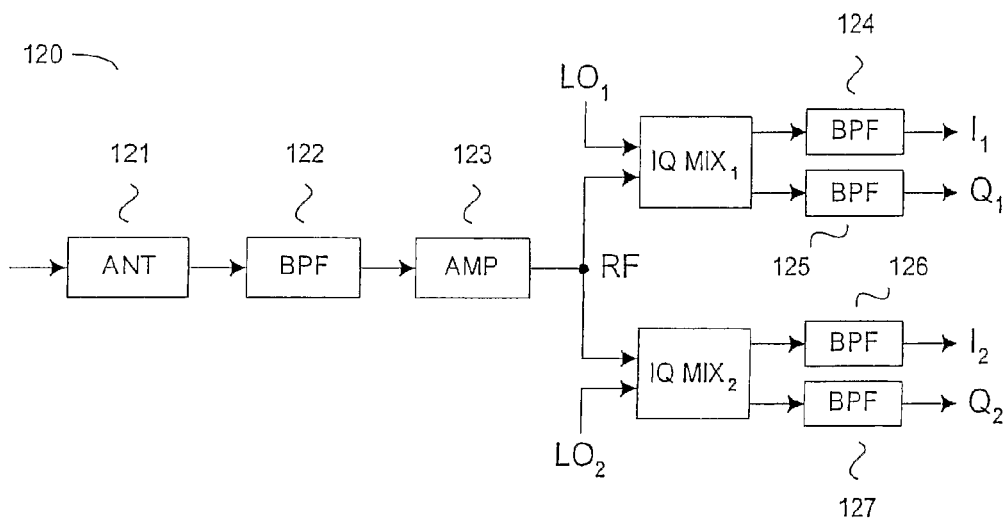
Fig. 1b Receiver (one channel)
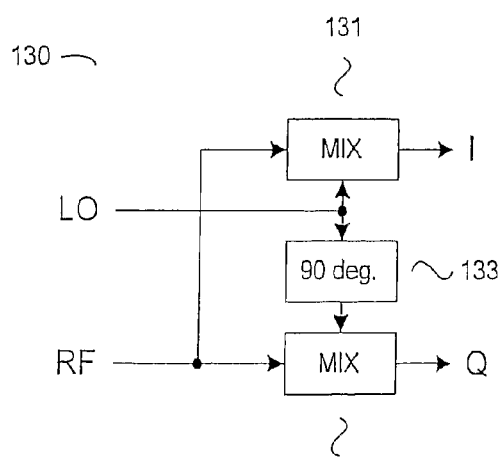
Fig. 1c IQ Mixer Relative Location of Receive
Antenna Channels
(as seen from behind the antenna)

Frequencies of Peaks from FM Up-Ramp

|  | $f_{fm-up1}$ | $f_{fm-up2}$ | | | $f_{fm-upi}$ | | | | |
|---|---|---|---|---|---|---|---|---|---|
| $f_{fm-dw1}$ | $v_{11}$ | $v_{21}$ | | | | | | | |
| $f_{fm-dw2}$ | $v_{12}$ | $v_{22}$ | | | | | | | |
| | | | | | | | | | |
| | | | | | | | | | |
| | | | | | | | | | |
| $f_{fm-dwj}$ | | | | | | $v_{ij}$ | | | |
| | | | | | | | | | |
| | | | | | | | | | |

(Frequencies of Peaks from FM Down-Ramp)

$f_{fm-up\,i}$: Frequency of upramp peak i
$f_{fm-dw\,j}$: Frequency of downramp peak j
$v_{ij}$: Velocity measurement derived from the selected pair of up- and downramp peaks

Figure 9

SYSTEM AND METHOD FOR RADAR DETECTION OF AN OBJECT

FIELD OF THE INVENTION

The present invention relates to a system and a method for radar detection of an object. More particularly, the invention relates to radar detection of an object by simultaneously transmitting a continuous-wave, CW, radar signal and a frequency modulated continuous-wave, FM-CW, signal or a multi-frequency, MF, radar signal.

DESCRIPTION OF THE PRIOR ART

A number of radar detection systems are known, especially within the area of providing automobiles with radars for road traffic control.

In U.S. Pat. No. 5,731,778 is described an FM-CW radar, which is suitable for automotive anti-collision systems. This radar outputs a radar signal in the form of a triangular wave whose frequency is increased at a given rate and decreased at a given rate. A receiver receives a wave reflected from a target to produce a beat signal and takes the Fourier transform of the beat signal to determine peak frequency components thereof showing peaks in a frequency spectrum. The receiver also determines phases of the peak frequency components and selects at least one from the peak frequency components in a frequency-rising range wherein the frequency of the radar signal is increased and at least one from the peak frequency components in a frequency-falling range wherein the frequency of the radar signal is decreased, which show substantially the same phase to pair them for determining the distance to and relative speed of the target based on the frequency of the paired peak frequency components. However, for the system described in U.S. Pat. No. 5,731,778 there is no transmission of a CW radar signal, whereby the system relies on the pairing of peak frequency components from the frequency-rising range and frequency-falling range leading to an ambiguity when determining target distance and speed.

In U.S. Pat. No. 5,325,097 is described a road vehicle radar system for discriminating between hazard and non-hazard targets within a predetermined zone. The described system uses a pair of frequency modulated continuous wave radar cycles, FM-CW, and a single continuous wave cycle, CW, in the generation of radar quantities for measuring target range and apparent target velocity. It is preferred to use a triangular FM-CW radar wave with an increase in frequency during a first cycle and a decrease in frequency during a second cycle. A FM-CW Doppler quantity may be determined from the received FM-CW radar signals and a CW Doppler quantity may be determined from the received CW radar signal. The Doppler quantities correspond to target velocities, and from the obtained FM-CW and CW Doppler quantities it is determined whether the target is a hazard or non-hazard target. In U.S. Pat. No. 5,325,097, both a CW signal, which gives information on the target velocity only, and a FM-CW, which holds information relating to the target velocity and distance, are used, thereby reducing the ambiguity when determining target velocity and distance. However, the FM-CW and CW signals are transmitted at different time cycles, so that the target observation must be divided into three time cycles, thereby reducing the sensitivity of the radar system. The issue of determining the range and velocity of multiple objects simultaneously was not addressed either, since the system was intended to provide detection only of the most prominent object in sight.

Thus, there is a need for a radar detection system capable of providing unambiguous range and velocity measurements of one or more objects, especially of those travelling at supersonic velocities, while at the same time using a minimum of time cycles in order to increase the sensitivity of the system. A solution to such a radar detection system is provided by the system of the present invention.

SUMMARY OF THE INVENTION

According to the present invention there is provided a radar system for detection of one or more objects, said system comprising: a radar wave transmitter for simultaneously transmitting a CW radar signal and a FM-CW or MF radar signal, and a first radar wave receiver for receiving CW and FM-CW or MF radar signals reflected from one or more objects present in a detection range of the radar system.

Here, the transmitted MF radar signal may alternate between two or more signal frequencies.

It is within a preferred embodiment of the invention that the radar system further comprises: a first CW mixer for mixing CW transmission signals and reflected CW signals received by the first receiver, and a first FM-CW or MF mixer for mixing FM-CW or MF transmission signals and corresponding reflected FM-CW or MF signals received by the first receiver.

Here, within a first aspect of the invention, it is preferred that: the radar wave transmitter is adapted for simultaneously transmitting a CW radar signal and a FM-CW radar signal; the first radar wave receiver is adapted for receiving CW and FM-CW radar signals reflected from one or more objects present in a detection range of the radar system; the first CW mixer is a mixer for mixing CW transmission signals and reflected CW signals received by the first receiver to produce one or more first CW beat signals, each first CW beat signal relating to the velocity of an object; and the first FM-CW or MF mixer is a first FM-CW mixer for mixing FM-CW transmission signals and reflected FM-CW signals received by the first receiver to produce one or more first FM-CW beat signals relating to the distance o and the velocity of an object.

So, according to the first aspect of the invention there is provided a radar system for detection of one or more objects, said system comprising: a radar wave transmitter for simultaneously transmitting a CW radar signal and a FM-CW radar signal; a first radar wave receiver for receiving CW and FM-CW radar signals reflected from one or more objects present in a detection range of the radar system; a first CW mixer for mixing CW transmission signals and reflected CW signals received by the first receiver to produce one or more first CW beat signals, each first CW beat signal relating to the velocity of an object; and a first FM-CW mixer for mixing FM-CW transmission signals and reflected FM-CW signals received by the first receiver to produce one or more first FM-CW beat signals, each first FM-CW beat signal relating to the distance to and the velocity of an object.

For systems of the invention wherein the radar wave transmitter is adapted for simultaneously transmitting a CW radar signal and a FM-CW radar signal, the FM-CW radar signal may be a saw-tooth or ramp modulated signal. Here, the ramp modulated signal may have an up-ramp waveform with an increase in frequency during the up-ramp period or a down-ramp waveform with a decrease in frequency during the down ramp period. Alternatively, the FM-CW radar signal may have a triangular shaped waveform with up-ramp periods having an increase in frequency and down-ramp periods having a decrease in frequency.

According to a second aspect of the invention, it is preferred that: the radar wave transmitter is adapted for simultaneously transmitting a CW radar signal and a MF radar signal; the first radar wave receiver is adapted for receiving CW and MF radar signals reflected from an object present in a detection range of the radar system; the first CW mixer is a mixer for mixing CW transmission signals and reflected CW signals received by the first receiver to produce one or more first CW beat signals, each first CW beat signal relating to the velocity of an object; and the first FM-CW or MF mixer is a first MF mixer for mixing MF transmission signals and reflected MF signals received by the first receiver to produce one or more first MF beat signals, each first MF beat signal relating to the distance to and the velocity of an object.

So, according to the second aspect of the present invention there is provided a radar system for detection of one or more objects, said system comprising: a radar wave transmitter for simultaneously transmitting a CW radar signal and a MF radar signal; a first radar wave receiver for receiving CW and MF radar signals reflected from one or more objects present in a detection range of the radar system; a first CW mixer for mixing CW transmission signals and reflected CW signals received by the first receiver to produce one or more first CW beat signals, each first CW beat signal relating to the velocity of an object; and a first MF mixer for mixing MF transmission signals and reflected MF signals received by the first receiver to produce one or more first MF beat signals, each first MF beat signal relating to the distance to and the velocity of an object.

It is preferred that the radar system of the invention further comprises a second radar wave receiver for receiving reflected CW and FM-CW or MF radar signals. Here, the first and second receivers may be arranged in the same plane. It is also within a preferred embodiment that at least the first and the second radar wave receivers are arranged along a first receiver direction. It is also preferred that the radar system of the invention further comprises a third radar wave receiver for receiving reflected CW and FM-CW or MF radar signals, where the first, second and third receivers may be arranged in the same plane. The radar system may also comprises a fourth radar wave receiver for receiving reflected CW and FM-CW or MF radar signals, where the first, second, third and fourth receivers may be arranged in the same plane.

For a radar system of the invention having more than one receiver it is within a preferred embodiment that at least two receivers are arranged along the first receiver direction and at least two receivers are arranged along a second receiver direction, said first receiver direction being different to the second receiver direction. Here, the first and second receiver directions may be substantially perpendicular to each other.

It should be understood that it is also within the present invention that when the radar system comprises two or more radar wave receivers, the system may further comprise corresponding CW mixers and FM-CW or MF mixers.

Thus, when the system has a first CW mixer, a first FM-CW mixer and a second receiver, the system may further comprise a second CW mixer for mixing CW transmission signals and reflected CW signals received by the second receiver to produce one or more second CW beat signals, each second CW beat signal relating to the velocity of an object, and a second FM-CW mixer for mixing FM-CW trans-mission signals and reflected FM-CW signals received by the second receiver to produce one or more second FM-CW beat signals, each second FM-CW beat signal relating to the distance to and the velocity of an object. When the system also has a third receiver, it may further comprise a third CW mixer for mixing CW transmission signals and reflected CW signals received by the third receiver to produce one or more third CW beat signals, each third CW beat signal relating to the velocity of an object, and a third FM-CW mixer for mixing FM-CW transmission signals and reflected FM-CW signals received by the third receiver to produce one or more third FM-CW beat signals, each third FM-CW beat signal relating to the distance to and the velocity of an object. When the system further has a fourth receiver, it may also comprise a fourth CW mixer for mixing CW transmission signals and reflected CW signals received by the fourth receiver to produce one or more fourth CW beat signals, each fourth CW beat signal relating to the velocity of an object, and a fourth FM-CW mixer for mixing FM-CW transmission signals and reflected FM-CW signals received by the fourth receiver to produce one or more fourth FM-CW beat signals, each fourth FM-CW beat signal relating to the distance to and the velocity of an object.

For systems of the invention comprising a CW mixer for producing a CW beat signal, the system may further comprise means for determining an object velocity or a relative object velocity of one or more objects based on at least part of the produced CW beat signals. It is within a preferred embodiment of the system that for each CW mixer there is corresponding transforming means for taking the Fourier transform of the beat signal(s) from said CW mixer. Here, the system may further comprise means for summing the Fourier transformed outputs corresponding to each of said CW mixer and for determining a number of CW peak frequencies from the summed Fourier transformed CW signals. The system may further comprise means for determining a CW object velocity based on a selected CW peak frequency, said CW object velocity corresponding to the velocity or the relative velocity of an object providing a Doppler frequency corresponding to the selected CW peak frequency.

For systems of the invention comprising one or more FM-CW mixers for producing corresponding FM-CW beat signals, it is preferred that for each FM-CW mixer there is corresponding transforming means for taking the Fourier transform of the beat signal(s) from said FM-CW mixer. Also here, the system may further comprise means for summing the Fourier transformed outputs corresponding to each of said FM-CW mixers and for determining a number of FM-CW peak frequencies from the summed Fourier transformed FM-CW signals.

According to an embodiment of the system of the invention, the radar wave transmitter is adapted for transmitting a FM-CW radar signal having a triangular waveform with the frequency being increased at a given first rate and decreased at said first rate, and wherein the radar system comprises: means for selecting from the determined FM-CW peak frequencies a pair of FM-CW peak frequencies corresponding to consecutive up- and down ramps of the transmitted FM-CW signal; means for determining a FM-CW object velocity based on the selected pair of FM-CW peak frequencies; means for comparing the determined FM-CW object velocity with one or more determined CW object velocities to thereby obtain a CW peak frequency corresponding to the selected pair of FM-CW peak frequencies; and means for determining an object distance from the selected pair of FM-CW peak frequencies or from the corresponding CW peak frequency and at least one of the selected pair of FM-CW peak frequencies.

For systems of the invention having at least two radar wave receivers, the system may further comprise means for detecting phase differences between corresponding reflected CW or FM-CW radar signals received by at least two different radar wave receivers.

For systems of the invention having receivers arranged along the first receiver direction, the system may further comprise one or more phase detectors for detecting, based at least partly on corresponding radar signals received by the receivers along the first receiver direction, one or more time or phase differences relating to a first object angular direction. For systems of the invention having receivers arranged along the first and second receiver directions, the system may further comprise one or more phase detectors for detecting, based at least partly on corresponding radar signals received by the receivers along the second receiver direction, one or more time or phase differences relating to a second object angular direction. For systems of the invention having one or more phase detectors, one or more of said phase detectors may be adapted for determining a phase difference based on at least two Fourier transformed outputs representing received radar signals corresponding to at least two receivers arranged along the same receiver direction, said received radar signals corresponding to the same transmitted radar signal.

According to an embodiment of the radar system of the invention at least two receivers are arranged horizontally besides each other. Hereby, a detected time or phase difference between corresponding radar signals received by the two horizontally arranged receivers may relate to an azimuth phase difference. It is also within an embodiment of the invention that at least two receivers are arranged vertically above each other. Hereby, a detected time or phase difference between corresponding radar signals received by the two vertically arranged receivers may relate to an elevation phase difference. Thus, it is preferred that the radar system may have at least three radar receivers, with a first and a second receiver arranged horizontally besides each other, and a third receiver arranged vertically below the first or second receiver. It is further preferred that the radar system may have at least four receivers, with the first and second receivers being arranged horizontally besides each other, the third and fourth receivers being arranged horizontally besides each other, and with the third and fourth receivers being arranged vertically below the first and second receivers, respectively.

For systems of the invention having receivers arranged along the first receiver direction, then at least two receivers may be arranged along the first receiver direction, and the phase detecting means may be adapted to determine a first phase difference between corresponding reflected CW or FM-CW radar signals received by said at least two radar wave receivers arranged along the first receiver direction, said first phase difference relating to a first object angular direction. Here, the phase detecting means may be adapted to determine the first phase difference from at least two Fourier transformed outputs representing CW or FM-CW signals corresponding to the at least two receivers arranged along the first receiver direction.

When the system has two receivers arranged horizontally besides each other, the phase detecting means may be adapted to determine an azimuth phase difference between corresponding reflected CW or FM-CW radar signals received by said two horizontally arranged radar wave receivers. Here, the phase detecting means may be adapted to determine an azimuth phase difference between two Fourier trans-formed outputs representing CW or FM-CW signals corresponding to the two horizontally aligned receivers.

For systems of the invention having receivers arranged along the first and second receiver directions, then at least two receivers may be arranged along the second receiver direction, and the phase detecting means may be adapted to determine a second phase difference between corresponding reflected CW or FM-CW radar signals received by said at least two radar wave receivers arranged along the second receiver direction, said second phase difference relating to a second object angular direction. Here, the phase detecting means may be adapted to determine the second phase difference from at least two Fourier transformed outputs representing CW or FM-CW signals corresponding to the at least two receivers arranged along the second receiver direction.

When the system has two receivers arranged vertically above each other, the phase detecting means may be adapted to determine an elevation phase difference between corresponding reflected CW or FM-CW radar signals received by said two vertically arranged radar wave receivers. Here, the phase detecting means may be adapted to determine an elevation phase difference between two Fourier trans-formed outputs representing CW or FM-CW signals corresponding to the two vertically aligned receivers.

For systems of the invention having at least two radar wave receivers and means for detecting phase differences between corresponding reflected CW or FM-CW radar signals received by two different radar wave receivers, it is preferred that the phase detecting means are adapted to determine a phase difference between two Fourier transformed outputs corresponding to a selected CW peak frequency, and to determine a phase difference between two Fourier transformed outputs corresponding to a selected FM-CW peak frequency.

For systems of the invention having four radar wave receivers with the first and second receivers being arranged horizontally besides each other, the third and fourth receivers being arranged horizontally besides each other, and with the third and fourth receivers being arranged vertically below the first and second receivers, respectively, it is preferred that the phase detecting means are adapted to determine an azimuth phase difference between the sum of the two Fourier transformed outputs corresponding to the first and third receivers and the sum of the two Fourier transformed outputs corresponding to the second and fourth receivers. It is furthermore preferred that the phase detecting means are adapted to determine an elevation phase difference between the sum of the two Fourier transformed outputs corresponding to the first and second receivers and the sum of the two Fourier transformed outputs corresponding to the third and fourth receivers.

For systems of the invention having phase detecting means and receivers arranged along the first and second receiver directions it is preferred that the phase detecting means are adapted to determine first and second phase differences for Fourier transformed outputs corresponding to a selected CW peak frequency, and for Fourier transformed outputs corresponding to a selected FM-CW peak frequency.

For systems of the invention having phase detecting means, it is preferred that the phase detecting means are adapted to determine azimuth and elevation phase differences for Fourier transformed outputs corresponding to a selected CW peak frequency, and/or for Fourier transformed outputs corresponding to a selected FM-CW peak frequency.

For systems of the invention having phase detecting means, the system may further comprise means for establishing and maintaining one or more CW track records corresponding to one or more objects, each track record comprising a number of detected CW peak frequencies as a function of time and further holding information of first and second angular directions as a function of time determined from measurements of corresponding first and second phase differences, or further holding information of azimuth and elevation angles as a function of time determined from corresponding azimuth and elevation phase measurements.

It is within an embodiment of the invention that the system further comprises predicting means for, based on a selected track record holding CW peak frequency information and information of first and second angular directions as a function of time, predicting for an object corresponding to said selected track record expected CW peak frequencies and information of first and second angular directions at a required time posterior to the time of the last stored peak frequency information of said selected track record.

It is also within an embodiment of the invention that the system comprises predicting means for, based on a selected track record holding CW peak frequency information and azimuth and elevation angle information as a function of time, predicting for an object corresponding to said selected track record expected CW peak frequencies and azimuth and elevation angle information at a required time posterior to the time of the last stored peak frequency information of said selected track record.

It is also preferred that the system further comprises means for establishing and maintaining one or more FM-CW track records corresponding to one or more objects, each track record comprising a number of detected FM-CW peak frequencies as a function of time and further holding information of first and second angular directions as a function of time determined from measurements of corresponding first and second phase differences, or further holding information of azimuth and elevation angles as a function of time determined from corresponding azimuth and elevation phase measurements.

It is within an embodiment of the invention that the system further comprises predicting means for, based on a selected track record holding FM-CW peak frequency information and information of first and second angular directions as a function of time, predicting for an object corresponding to said selected track record expected FM-CW peak frequencies and first and second angular information at a required time posterior to the time of the last stored peak frequency information of said selected track record.

It is also within an embodiment of the invention that the system further comprises predicting means for, based on a selected track record holding FM-CW peak frequency information and azimuth and elevation angle information as a function of time, predicting for an object corresponding to said selected track record expected FM-CW peak frequencies and azimuth and elevation angle information at a required time posterior to the time of the last stored peak frequency information of said selected track record.

The system may furthermore comprise means for selecting from the CW track records and the FM-CW track records one or more pairs of CW and FM-CW peak frequencies having corresponding first and second angular directions or corresponding azimuth and elevation angles, and for determining from an obtained pair of CW and FM-CW peak frequencies an object velocity and a corresponding object distance.

For systems having means for determining object velocities and corresponding object distances, the system may further comprise means for establishing and maintaining one or more track records holding combined CW and FM-CW peak frequency information as a function of time for one or more objects having a velocity and distance determined from a pair of previously measured CW and/or FM-CW peak frequencies having corresponding velocities. Here, the system may further comprise predicting means for, based on a selected track record holding combined CW and FM-CW peak frequency information as a function of time, predicting for an object corresponding to said selected track record expected CW and FM-CW peak frequencies at a required time posterior to the time of the last stored peak frequency information of said selected track record.

The system may also or alternatively comprise means for establishing and maintaining one or more track records holding combined CW and FM-CW peak frequency information and information of first and second angular directions as a function of time for one or more objects having a velocity and distance determined from a pair of previously measured CW and FM-CW peak frequencies having corresponding first and second angular directions. Here, the system may further comprise means for, based on a selected track record holding combined CW and FM-CW peak frequency information and information of first and second angular directions as a function of time, predicting for an object corresponding to said selected track record expected CW and FM-CW peak frequencies and information of first and second angular directions at a required time posterior to the time of the last stored peak frequency information of said selected track record.

The system may also or alternatively comprise means for establishing and maintaining one or more track records holding combined CW and FM-CW peak frequency information and azimuth and elevation angle information as a function of time for one or more objects having a velocity and distance determined from a pair of previously measured CW and FM-CW peak frequencies having corresponding azimuth and elevation angles. Here, the system may comprise means for, based on a selected track record holding combined CW and FM-CW peak frequency information and azimuth and elevation angle information as a function of time, predicting for an object corresponding to said selected track record expected CW and FM-CW peak frequencies and azimuth and elevation angle information at a required time posterior to the time of the last stored peak frequency information of said selected track record.

According to the present invention there is also provided a method of radar detection of one or more objects, said method comprising: simultaneously transmitting a CW radar signal and a FM-CW or MF radar signal, and receiving, via a first radar receiver, reflected CW and FM-CW or MF radar signals reflected from one or more object present in a detection range of the radar system.

Also here, the transmitted MF radar signal may alternate between two or more signal frequencies.

It is preferred that the method of the invention further comprises: mixing, via a first CW mixer, CW transmission signals and reflected CW signals received by the first receiver, and mixing, via a first FM-CW or MF mixer, FM-CW or MF transmission signals and corresponding reflected FM-CW or MF signals received by the first receiver.

Here, according to the first aspect of the invention, it is preferred that the CW radar signal is transmitted simultaneously with a FM-CW radar signal; the receiving step comprises receiving CW and FM-CW radar signals reflected from one or more objects present in a radar detection range; the CW transmission signals and reflected CW signals received by the first receiver are mixed, via the first CW mixer, to produce one or more first CW beat signals, each first CW beat signal relating to the velocity of an object; and the FM-CW transmission signals and reflected FM-CW signals received by the first receiver are mixed, via a first FM-CW mixer, to produce one or more first FM-CW beat signals, each first FM-CW beat signal relating to the distance to and the velocity of an object.

So, according to the first aspect of the invention there is provided a method of radar detection of one or more objects, said method comprising: simultaneously transmitting a CW radar signal and a FM-CW radar signal; receiving, via a first radar receive, reflected CW and FM-CW radar signals reflected from an object present in a radar detection range; mixing, via a first CW mixer, CW transmission signals and reflected CW signals to produce one or more first CW beat signals, each first CW beat signal relating to the velocity of an object; and mixing, via a first FM-CW mixer, FM-CW transmission signals and reflected FM-CW signals to produce one or more first FM-CW beat signals, each first FM-CW beat signal relating to the distance and the velocity of an object.

For methods of the invention having simultaneously transmission of a CW radar signal and a FM-CW radar signal, the transmitted FM-CW radar signal may be a saw-tooth or ramp modulated signal. Here, the ramp modulated signal may have an up-ramp waveform with an increase in frequency during the up-ramp period or a down-ramp waveform with a decrease in frequency during the down ramp period. Alternatively, the transmitted FM-CW radar signal may have a triangular shaped waveform with up-ramp periods having an increase in frequency and down-ramp periods having a decrease in frequency.

According to the second aspect of the invention, it is preferred that the CW radar signal is transmitted simultaneously with a MF radar signal; the receiving step comprises receiving CW and MF radar signals reflected from one or more objects present in a detection range of the radar system; the CW transmission signals and reflected CW signals received by the first receiver are mixed, via the first CW mixer, to produce one or more first CW beat signals, each first CW beat signal relating to the velocity of an object; and the MF transmission signals and reflected the MF signals received by the first receiver are mixed, via a first MF mixer, to produce one or more first MF beat signals, each first MF beat signal relating to the distance to and the velocity of an object.

So, according to the second aspect of the invention there is provided a method of radar detection of one or more objects, said method comprising: simultaneously transmitting a CW radar signal and a MF radar signal; receiving, via a first radar wave receiver, reflected CW and MF radar signals reflected from one or more objects present in a radar detection range; mixing, via a first CW mixer, CW transmission signals and reflected CW signals received by the first receiver to produce one or more first CW beat signals, each first CW beat signal relating to the velocity of an object; and mixing, via a first MF mixer, MF transmission signals and reflected MF signals received by the first receiver to produce one or more first MF beat signals, each first MF beat signal relating to a distance to and the velocity of an object.

It is preferred that the method of the invention further comprises receiving, via a second radar receiver, said reflected CW and FM-CW or MF radar signals. Also here, the first and second receivers may be arranged in the same plane. It is preferred that at least the first and second receivers are arranged along a first receiver direction. It is also preferred that the method of the invention further comprises receiving, via a third radar wave receiver, said reflected CW and FM-CW or MF radar signals, where the first, second and third receivers may be arranged in the same plane. The method may also further comprise receiving, via a fourth radar wave receiver, said reflected CW and FM-CW or MF radar signals, where the first, second, third and fourth receivers may be arranged in the same plane.

According to an embodiment of the invention, the method may use at least two receivers being arranged along the first receiver direction and at least two receivers being arranged along a second receiver direction, said first receiver direction being different to the second receiver direction. Also here, the first and second receiver directions may be substantially perpendicular to each other.

For a method according to the first aspect of the invention using a first CW mixer, a first FM-CW mixer, and a second receiver, said method may further comprise: mixing, via a second CW mixer, CW transmission signals and reflected CW signals received by the second receiver to produce one or more second CW beat signals, each second CW beat signal relating to the velocity of an object; and mixing, via a second FM-CW mixer, FM-CW transmission signals and reflected FM-CW signals received by the second receiver to produce one or more second FM-CW beat signals, each second FM-CW beat signal relating to the distance to and the velocity of an object. For a method further using a third receiver, said method may further comprise: mixing, via a third CW mixer, CW transmission signals and reflected CW signals received by the third receiver to produce one or more third CW beat signals, each third CW beat signal relating to the velocity of an object; and mixing, via a third FM-CW mixer, FM-CW transmission signals and reflected FM-CW signals received by the third receiver to produce one or more third FM-CW beat signals, each third FM-CW beat signal relating to the distance to and the velocity of an object. For a method using a fourth receiver, the method may further comprise: mixing, via a fourth CW mixer, CW transmission signals and reflected CW signals received by the fourth receiver to produce one or more fourth CW beat signals, each CW beat signal relating to the velocity of an object; and a fourth FM-CW mixer for mixing FM-CW transmission signals and reflected FM-CW signals received by the fourth receiver to produce one or more fourth FM-CW beat signals, each fourth FM-CW signal relating to the distance to and the velocity of an object.

For a method of the invention using one or more CW mixers for producing corresponding CW beat signals, the method may further comprise determining an object velocity or a relative object velocity of one or more objects based on at least part of the produced CW beat signals. It is also preferred that for a method of the invention using one or more CW mixers for producing corresponding CW beat signals the method may comprise taking the Fourier transform of the beat signals from each CW mixer. Here, the method may further comprise summing the Fourier trans-formed outputs corresponding to each of said CW mixer, and determining a number of CW peak frequencies from the summed Fourier transformed CW signals. It is within an embodiment of the invention that the method further comprises determining a CW object velocity based on a selected CW peak frequency, said CW object velocity corresponding to the velocity or the relative velocity of an object providing a Doppler frequency corresponding to the selected CW peak frequency.

For a method of the invention using one or more FM-CW mixers for producing corresponding FM-CW beat signals, the method may further comprise taking the Fourier transform of the beat signals from each FM-CW mixer. Also here, the method may further comprise summing the Fourier transformed outputs corresponding to each of said FM-CW mixer, and determining a number of FM-CW peak frequencies from the summed Fourier transformed FM-CW signals.

According to an embodiment of a method of the first aspect of the invention, the transmitted FM-CW radar signal has a triangular waveform with the frequency being increased at a given first rate and decreased at said first rate, and the method further comprises: selecting from the determined FM-CW peak frequencies a pair of FM-CW peak frequencies corresponding to consecutive up- and down ramps of the transmitted FM-CW signal; determining a FM-CW object velocity based on the selected pair of FM-CW peak frequencies; comparing the determined FM-CW object velocity with one or more determined CW object velocities to thereby obtain a CW peak frequency corresponding to the selected pair of FM-CW peak frequencies; and determining an object distance from the selected pair of FM-CW peak frequencies or from the corresponding CW peak frequency and at least one of the selected pair of FM-CW peak frequencies.

For a method of the invention using at least two radar receivers it is within an embodiment of the invention that the method further comprises detecting phase differences between corresponding reflected CW or FM-CW radar signals received by two different radar wave receivers.

For a method of the invention using at least two receivers arranged along the first receiver direction, said method may further comprise detecting a time or phase difference between corresponding radar signals received by at least two of the receivers arranged along the first receiver direction, said time or phase difference relating to a first angular direction. For a method of the invention using at least two receivers arranged along the second receiver direction, said method may further comprise detecting a time or phase difference between corresponding radar signals received by at least two of the receivers arranged along the second receiver direction, said time or phase difference relating to a second angular direction. It is preferred that the detection of a time or phase difference is based on at least two Fourier trans-formed outputs representing received radar signals corresponding to at least two receivers arranged along the same receiver direction, said received radar signals corresponding to the same transmitted radar signal.

According to a preferred embodiment, the method may use at least two receivers being arranged horizontally besides each other, and the method may further comprise: detecting a time or phase difference between corresponding radar signals received by the two horizontally arranged receivers, whereby the detected time or phase difference of the horizontally arranged receivers may relate to an azimuth phase difference. It is also within an embodiment of the method of the invention that at least two receivers are arranged vertically above each other, and the method further comprises: detecting a time or phase difference between corresponding radar signals received by the two vertically arranged receivers, whereby the detected time or phase difference of the vertically arranged receivers may relate to an elevation phase difference. Thus, it is preferred that the radar system used for the method of the invention may have at least three radar receivers, with a first and a second receiver arranged horizontally besides each other, and a third receiver arranged vertically below the first or second receiver. It is further preferred that the radar system may have at least four receivers, with the first and second receivers being arranged horizontally besides each other, the third and fourth receivers being arranged horizontally besides each other, and with the third and fourth receivers being arranged vertically below the first and second receivers, respectively.

For a method of the invention using at least two radar receivers, at least two receivers may be arranged along the first receiver direction, and the detection of phase differences may comprise determining a first phase difference between corresponding reflected CW or FM-CW radar signals received by said at least two radar wave receivers arranged along the first receiver direction, said first phase difference relating to a first object angular direction. Here, the detection of phase differences may comprise determining the first phase difference from at least two Fourier trans-formed outputs representing CW or FM-CW signals corresponding to at least two of the receivers arranged along the first receiver direction.

The method of the invention also covers embodiments wherein two receivers may be arranged horizontally besides each other, and the detection of phase differences may comprise determining an azimuth phase difference between corresponding reflected CW or FM-CW radar signals received by said two horizontally arranged radar wave receivers. It is preferred that the detecting of phase differences comprises determining an azimuth phase difference between two Fourier transformed outputs representing CW or FM-CW signals corresponding to the two horizontally aligned receivers.

For a method of the invention using at least two receivers arranged along the second receiver direction, the detection of phase differences may comprise determining a second phase difference between corresponding reflected CW or FM-CW radar signals received by said at least two radar wave receivers arranged along the second receiver direction, said second phase difference relating to a second object angular direction. Here, the detection of phase differences may comprise determining the second phase difference from at least two Fourier transformed outputs representing CW or FM-CW signals corresponding to at least two of the receivers along the second direction.

It is also within the present invention that two receivers are arranged vertically above each other, and the detection of phase differences comprises determining an elevation phase difference between corresponding reflected CW or FM-CW radar signals received by said two vertically arranged radar wave receivers. Here, the detecting of phase differences may comprise determining an elevation phase difference between two Fourier transformed outputs representing CW or FM-CW signals corresponding to the two vertically aligned receivers.

For a method of the invention using at least two radar receivers and comprising detecting phase differences between corresponding reflected CW or FM-CW radar signals received by two different radar wave receivers, it is preferred that the detecting of phase differences comprises determining a phase difference between two Fourier transformed outputs corresponding to a selected CW peak frequency, and determining a phase difference between two Fourier transformed outputs corresponding to a selected FM-CW peak frequency.

For methods of the invention using four radar wave receivers with the first and second receivers being arranged horizontally besides each other, the third and fourth receivers being arranged horizontally besides each other, and with the third and fourth receivers being arranged vertically below the first and second receivers, respectively, it is preferred that the detecting of phase differences comprises determining an azimuth phase difference between the sum of the two Fourier transformed outputs corresponding to the first and third receivers and the sum of the two Fourier transformed outputs corresponding to the second and fourth receivers. It is further preferred that the detecting of phase differences comprises determining an elevation phase difference between the sum of the two Fourier transformed outputs corresponding to the first and second receivers and the sum of the two Fourier transformed outputs corresponding to the third and fourth receivers.

For methods of the invention comprising detecting of phase differences, it is within an embodiment of the invention that the detection of phase differences comprises determining first and second phase differences for Fourier transformed outputs corresponding to a selected CW peak frequency, and for Fourier transformed outputs corresponding to a selected FM-CW peak frequency.

For methods of the invention comprising detecting of phase differences, it is also within an embodiment of the invention that the detecting of phase differences comprises determining azimuth and elevation phase differences for Fourier transformed outputs corresponding to a selected CW peak frequency, and for Fourier trans-formed outputs corresponding to a selected FM-CW peak frequency.

Here, the method may further comprise establishing and maintaining one or more CW track records corresponding to one or more objects, each track record comprising a number of detected CW peak frequencies as a function of time and further holding information of first and second angular directions as a function of time determined from measurements of corresponding first and second phase differences, or further holding information of azimuth and elevation angles as a function of time determined from corresponding azimuth and elevation phase measurements.

It is within an embodiment of the invention that the method further comprises, based on a selected track record holding CW peak frequency information and information of first and second angular directions as a function of time, predicting for an object corresponding to said selected track record expected CW peak frequencies and information of first and second angular directions at a required time posterior to the time of the last stored peak frequency information of said selected track record.

It is also within an embodiment of the invention that the method further comprises, based on a selected track record holding CW peak frequency information and azimuth and elevation angle information as a function of time, predicting for an object, which object corresponds to said selected track record, expected CW peak frequencies and azimuth and elevation angle information at a required time posterior to the time of the last stored peak frequency information of said selected track record.

It is also preferred that the method comprises establishing and maintaining one or more FM-CW track records corresponding to one or more objects, each track record comprising a number of detected FM-CW peak frequencies as a function of time and further holding information of first and second angular directions as a function of time determined from measurements of corresponding first and second phase differences, or further holding information of azimuth and elevation angles as a function of time determined from corresponding azimuth and elevation phase measurements.

The method may further comprise, based on a selected track record holding FM-CW peak frequency information and information of first and second angular directions as a function of time, predicting for an object corresponding to said selected track record expected FM-CW peak frequencies and information of first and second angular directions at a required time posterior to the time of the last stored peak frequency information of said selected track record.

It is also within an embodiment of the invention that the method further may comprise, based on a selected track record holding FM-CW peak frequency information and azimuth and elevation angle information as a function of time, predicting for an object, which object corresponds to said selected track record, expected FM-CW peak frequencies and azimuth and elevation angle information at a required time posterior to the time of the last stored peak frequency information of said selected track record.

The method may furthermore comprise selecting from the CW track records and the FM-CW track records one or more pairs of CW and FM-CW peak frequencies having corresponding first and second angular directions or corresponding azimuth and elevation angles, and determining from an obtained pair of CW and FM-CW peak frequencies an object velocity and a corresponding object distance.

For a method comprising determination of object velocities and corresponding object distances, the method may further comprise establishing and maintaining one or more track records holding combined CW and FM-CW peak frequency information as a function of time for one or more objects having a velocity and distance determined from a pair of previously measured CW and/or FM-CW peak frequencies having corresponding velocities. Here, the method may further comprise, based on a selected track record holding combined CW and FM-CW peak frequency information as a function of time, predicting for an object, which object corresponds to said selected track record, expected CW and FM-CW peak frequencies at a required time posterior to the time of the last stored peak frequency information of said selected track record.

The method may also or alternatively comprise establishing and maintaining one or more track records holding combined CW and FM-CW peak frequency information and information of first and second angular directions as a function of time for one or more objects having a velocity and distance determined from a pair of previously measured CW and FM-CW peak frequencies having corresponding first and second angular directions. Here, the method may further comprise, based on a selected track record holding combined CW and FM-CW peak frequency information and information of first and second angular directions as a function of time, predicting for an object corresponding to said selected track record expected CW and FM-CW peak frequencies and information of first and second angular directions at a required time posterior to the time of the last stored peak frequency information of said selected track record.

Furthermore, the method may also or alternatively comprise establishing and maintaining one or more track records holding combined CW and FM-CW peak frequency information and azimuth and elevation angle information as a function of time for one or more objects having a velocity and distance determined from a pair of previously measured CW and FM-CW peak frequencies having corresponding azimuth and elevation angles. Here, the method may further comprise, based on a selected track record holding combined CW and FM-CW peak frequency information and azimuth and elevation angle information as a function of time, predicting for an object, which object corresponds to said selected track record, expected CW and FM-CW peak frequencies and azimuth and elevation angle information at a required time posterior to the time of the last stored peak frequency information of said selected track record.

Other objects, features and advantages of the present invention will be more readily apparent from the detailed description of the preferred embodiments set forth below, taken in conjunction with the accompanying drawings.

BRIEF DESCRIPTION OF THE DRAWINGS

FIGS. 1a, 1b and 1c are block diagrams illustrating a transmitter and a receiver of a combined CW and FM-CW radar system according to an embodiment of the present invention, FIG. 9 shows an object velocity table being part the processing of received FM-CW radar waves for a triangular shaped FM-CW waveform according to an embodiment of the present invention.

DETAILED DESCRIPTION OF THE INVENTION

Figure 2:
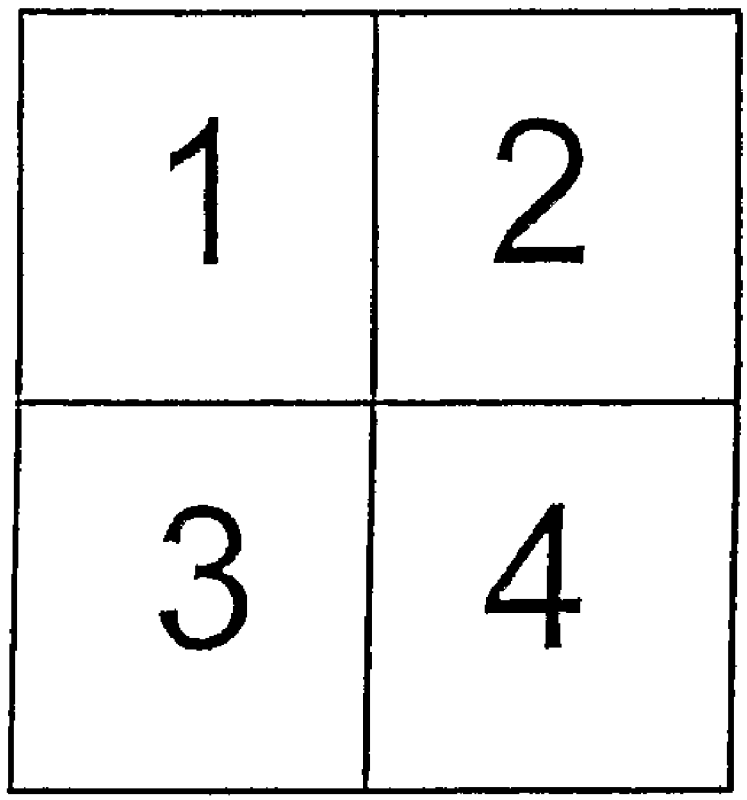
FIG. 2 shows a radar wave receiver according to an embodiment of the invention having 4 receive antenna channels.

FIG. 1 is a block diagram showing a transmitter 110, FIG. 1a, and a receiver 120, FIG. 1b, of a combined CW and FM-CW radar system according to an embodiment of the present invention. The transmitter 110 has two modulators, $MOD_1$ and $MOD_2$, controlling the output frequency of two voltage controlled oscillators, $VCO_1$ and $VCO_2$. Output from the first modulator, $MOD_1$, is fixed and therefore the output frequency of $VCO_1$ is also fixed at a frequency close to 10 GHz. Output from the second modulator, $MOD_2$, is either an up-ramp, a down-ramp or a triangular signal. The second voltage controlled oscillator $VCO_2$ outputs a corresponding frequency modulated signal close to 10 GHz, where the frequencies of the output signal is sweeping over a range of 1-150 MHz. The output frequencies from $VCO_1$ and $VCO_2$ are separated by at least 1 MHz. The $VCO_2$ signal has a sweeping time or ramp repetition period $T_r$ in the range of 10-100 mS. The frequency modulated output signal of $VCO_2$ may be a ramp modulated signal, a triangular shaped signal having equal up-ramp and down-ramp time periods, or the $VCO_2$ signal may have different up-ramp and down-ramp time periods. According to a first preferred embodiment, the $VCO_2$ signal is a ramp modulated signal having a ramp repetition period $T_r$ of 20 mS, a bandwidth BW of 50 MHz and a centre frequency of 50 MHz. According to a second preferred embodiment, the $VCO_2$ output signal is a triangular modulated signal having an up-ramp and a down-ramp period $T_r$ of 20 mS, a bandwidth BW of 50 MHz and a centre frequency of 50 MHz.

Output from the first voltage controlled oscillator, $VCO_1$, is fed into a band pass filter, $BPF_1$, in order to remove unwanted frequency components. The output signal of $BPF_1$, $LO_1$, is a continuous wave, CW, radio frequency signal, which is fed through an adder 101, and amplified by an amplifier, 102, and emitted as a CW radar signal via an antenna 103.

Output from the second voltage controlled oscillator, $VCO_2$, is fed into a band pass filter, $BPF_2$, in order to remove unwanted frequency components. The output signal of $BPF_2$, $LO_2$, is a frequency modulated-continuous wave, FM-CW, radio frequency signal, which is fed through the adder 101, and amplified by the amplifier, 102, and emitted as a FM-CW radar signal via the antenna 103.

The receiver channel 120 includes an antenna 121 for receiving reflected radar signals with the output of the antenna being fed to a band pass filter 122, where the output of the filter 122 is amplified via an amplifier 123. The output signal of the amplifier 123 is a radio frequency signal, RF, about the 10 GHz, which is fed to two IQ mixers, $IQ MIX_1$ and $IQ MIX_2$. Here, $IQ MIX_1$ is a CW mixer, which mixes the trans-mitted CW signal, $LO_1$, with the received RF signal. The low frequency components of the output contain the beat signals relating to the velocities of the objects reflecting the CW signal. Other frequency components are removed by the following band pass filters 124, 125. The $IQ MIX_2$ is a FM-CW mixer, which mixes the transmitted FM-CW signal, $LO_2$, with the received RF signal. The low frequency components of the output contain the beat signals relating to the distance and velocity of the objects reflecting the FM-CW signal. Other frequency components are removed by the following band pass filters 126, 127.

An example of an IQ mixer is shown in more details in FIG. 1c. Here, the IQ mixer 130 has two mixers 131, 132, each of which has as input the received RF signal and the transmitted CW or FM-CW signal. Furthermore, the IQ mixer 130 has an input LO, being either the $LO_1$ signal or the $LO_2$ signal, and via a phase shifter 133 the LO input is phase shifted about 90 degrees before being input to the mixer 132, when compared to the in-phase LO input to mixer 131. The resulting outputs are the inphase output I from mixer 131 and the quadrature output Q from mixer 132. The mixers 131 and 132 shifts the input signals from the radio frequency range down to low frequencies, so that the output signals I and Q are in the 0 to 1 MHz range.

For the CW mixer, $IQ MIX_1$, and the FM-CW mixer, $IQ MIX_2$, of the receiver 120, the I and Q outputs are all filtered by corresponding band pass filters, 124, 125 and 126, 127, to thereby obtain the outputs $I_1$, $Q_1$ and $I_2$, $Q_2$.

Each of the frequency components of the signals at the outputs $I_1$ and $Q_1$ corresponds to a beat signal resulting from the frequency difference between the transmitted CW signal and the signal reflected by an object with a radial velocity v with respect to the antenna.

This frequency difference is originated by the Doppler effect induced by the velocity of the object, being the relation between this velocity and the frequency of the beat signal given by:

$$f_{cw} = 2 \cdot \frac{v}{\lambda_{CW}} \quad (1)$$

where $f_{cw}$ is the frequency of the beat signal (the Doppler shift), and $\lambda_{cw}$ the wavelength of the transmitted CW signal.

A spectral analysis of the signals at the outputs $I_1$ and $Q_1$ serves to determine the amount and frequency values of the beat signals contained in them. This is achieved in the preferred embodiment of the invention by digitising the signals at the outputs $I_1$ and $Q_1$, grouping them into (possibly) overlapping blocks of equal amount of samples and performing an FFT (Fast Fourier Transform) to each block of samples. The frequency peaks observed in the resulting discrete spectra correspond to each of the beat signals present.

Each of the frequency components of the signals at the outputs $I_2$ and $Q_2$ corresponds to a beat signal resulting from the frequency difference between the transmitted FM-CW signal and the signal reflected by an object with a radial velocity v and a distance R with respect to the antenna.

This frequency difference is originated by linear frequency modulation of the transmitted signal and the Doppler effect induced by the velocity of the object, being the relation between the velocity and range of the object and the frequency of the beat signal given by:

$$f_{fm-up} = \frac{2 \cdot R}{c} \cdot \frac{BW}{T_r} + 2 \cdot \frac{v}{\lambda_{FM}} \quad (2)$$

for an up-ramp frequency modulation, and:

$$f_{fm-dw} = -\frac{2 \cdot R}{c} \cdot \frac{BW}{T_r} + 2 \cdot \frac{v}{\lambda_{FM}} \quad (3)$$

for a down-ramp frequency modulation, where $f_{fm-up}$ and $f_{fm-dw}$ are the frequencies of the beat signals with respectively and up-ramp and a down-ramp frequency modulation, $BW/T_r$ is the sweep rate of the ramp, $\lambda_{FM}$ is the wavelength corresponding to the centre frequency of the generated sweep, and c is the speed of light.

A spectral analysis of the signals at the outputs $I_2$ and $Q_2$ serves to determine the amount and frequency values of the beat signals contained in them. This is achieved in the preferred embodiment of the invention by digitising the signals at the outputs $I_2$ and $Q_2$, grouping them into (possibly) overlapping blocks of equal amount of samples and performing an FFT (Fast Fourier Transform) to each block of samples. The frequency peaks observed in the resulting discrete spectra correspond to each of the beat signals present.

When using a triangular waveform, it is possible to calculate the distance and radial velocity of an object if the frequencies of the FM-CW beat signals originated by this object in an up-ramp and a down-ramp section of the transmitted waveform are known simultaneously. In such case, the radial velocity and range of the object can be evaluated as:

$$v = \frac{\lambda_{FM}}{2} \cdot (f_{fm-up} + f_{fm-dw}) \quad (4)$$

$$R = \frac{T_r}{BW} \cdot \frac{c}{2} \cdot (f_{fm-up} - f_{fm-dw}) \quad (5)$$

Expressions 4 and 5 assume that the radial velocity and range of the object remain constant for both ramps, which is already not true for the range if the radial velocity of the object is not null. It is therefore that, when dealing with objects with very high radial velocities, it is preferred to evaluate their range by making use of the expression:

$$R = \frac{T_r}{BW} \cdot \frac{c}{2} \cdot \left(f_{fm-up} - \frac{\lambda_{CW}}{\lambda_{FM}} \cdot f_{cw}\right) \quad (6)$$

when the frequencies of the beat signals originated by the object in the CW and FM-CW channels during and up-ramp are known simultaneously, or:

$$R = \frac{T_r}{BW} \cdot \frac{c}{2} \cdot \left(-f_{fm-dw} + \frac{\lambda_{CW}}{\lambda_{FM}} \cdot f_{cw}\right) \quad (7)$$

in the case of a down-ramp. The radial velocity is then calculated as:

$$v = \frac{\lambda_{CW}}{2} \cdot f_{cw} \quad (8)$$

for both kinds of ramp.

The above expressions are especially suitable for a system like the one of the pre-sent invention, where a CW and an FM-CW signal are simultaneously transmitted, received and processed, and yield significantly more accurate results when the objects under observation present very high radial velocities with respect to the system.

It should be noted that transmitter 110 and the receiver 120 may have separate antennas 103, 121, but they may also share a single, common antenna. In FIG. 1 there is shown one receive antenna channel 120 having a receive antenna 121, but by having several receive antenna channels, with the corresponding receive antennas arranged in the same plane, it is possible to detect phase differences between corresponding reflected radar signals received by different receive antennas. For a preferred radar system according to the present invention, there are two receive antennas arranged horizontally besides each other and two receive antennas arranged vertically above each other. This requires 3 receive antenna channels. However, in another preferred embodiment there are 4 receive antenna channels with the receive antennas 1, 2, 3, 4 arranged as illustrated in FIG. 2. In FIG. 2, azimuth phase differences can be detected from the signals received by the horizontally arranged antennas 1 and 2 and similarly from the signals received by antennas 3 and 4. Accordingly, elevation phase differences can be detected from the signals received by the vertically arranged antennas 1 and 3 and similarly from the signals received by antennas 2 and 4. The 4 receive antennas 1, 2, 3, 4 in FIG. 2 may be used as a single transmit antenna 103 for the transmitter 110.

It should be understood that when performing a radar detection of an object according to the present invention using a radar system having a transmit antennae and one or more receive antennas arranged in the same plane and being arranged relatively close to each other, then an object velocity determined by the use of such a radar system relates to a radial velocity of the object. Furthermore, if the radar system is moving, then the object velocity relates to the relative, radial velocity of the object. The radial object velocity may be given as the velocity substantially in the direction of a line going from the centre of the object to the centre of the antenna system.

The relationship between the angle of arrival of a reflected signal, and the phase difference between the signals received by two antennas separated by a known distance, is given by the expression:

$$\varphi = \frac{2\pi}{\lambda} \cdot d \cdot \sin(\theta) \tag{9}$$

where $\phi$ is the phase difference between the signals received by each antenna, d is the distance between the antennas, and $\theta$ is the angle of incidence of the incoming signal with respect to the axis along which the antennas are aligned. The phase difference between the signals received by two sets of antennas arranged horizontally will yield the azimuth location with respect to the system of the object originating such signal. The phase difference between two sets of antennas arranged vertically will provide the elevation location with respect to the system of the referred object.

Figure 3A:
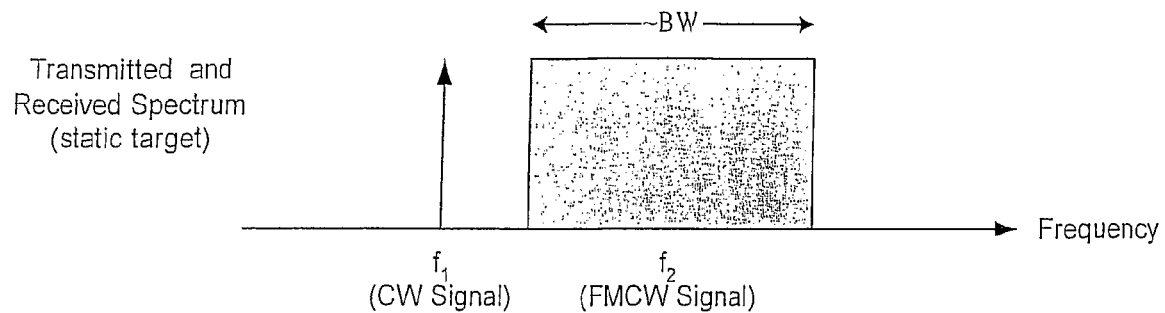
FIGS. 3a and 3b are graphs showing the relative frequency spectrum of transmitted and received radar wave according to an embodiment of the invention.
Figure 3B:
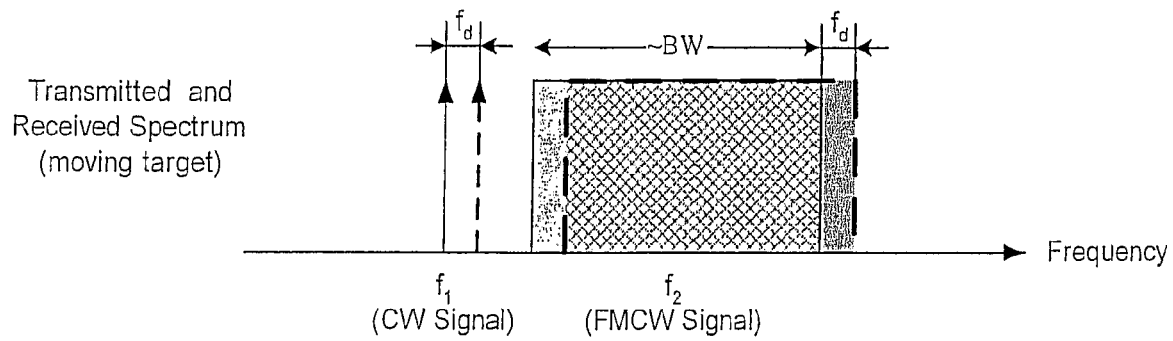

FIGS. 3a and 3b are graphs showing the relative frequency spectrum of the radar signal transmitted by the transmitter 110 and received by the receiver 120 for a static target or object, see FIG. 3a, and a moving target or object, see FIG. 3b. The transmitted spectrum consists of two signals, a CW and a FM-CW signal, whose centre frequencies are denoted by f1 and f2 in the figure. The CW signal is a sinusoid of constant amplitude and frequency. When this signal impinges on a moving target, the reflected signal collected by the receiver will be shifted in frequency with respect to the transmitted signal by an amount $f_d$ related to the radial velocity of the target with respect to the system. This is indicated in the figure by the dashed tone depicted in FIG. 3b. The FM-CW signal is sinusoid of constant amplitude whose frequency is modulated by either a saw-tooth or a triangle shaped signal, as shown in FIGS. 4 and 5. If the product of the swept frequency range and the sweep time is sufficiently high, the frequency spectrum of the transmitted signal approximates a pedestal whose width is the swept frequency range. When the signal impinges on a moving target, the spectrum of the received signal will also be shifted in frequency by an amount similar to the one experienced by the CW signal. In FIG. 3b, the transmitted FM-CW spectrum is outlined by a solid line, while that of the received signal is outlined by a dashed line.

Figure 4A:
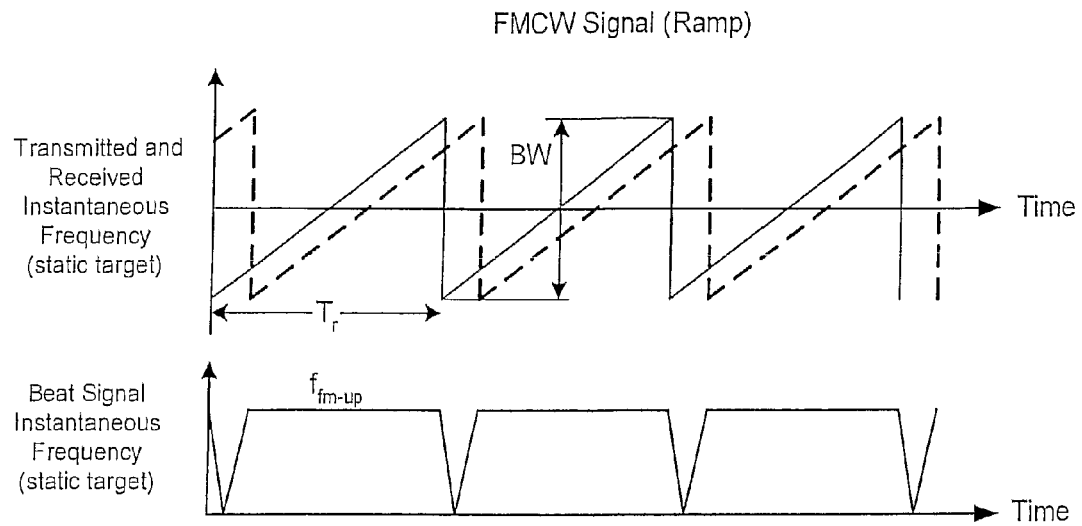
FIGS. 4a and 4b are graphs showing relations between waves transmitted and received by a radar system and beat signals for a static target and a moving target, when the transmitted signal is a ramp modulated FW-CW radar signal.
Figure 4B:
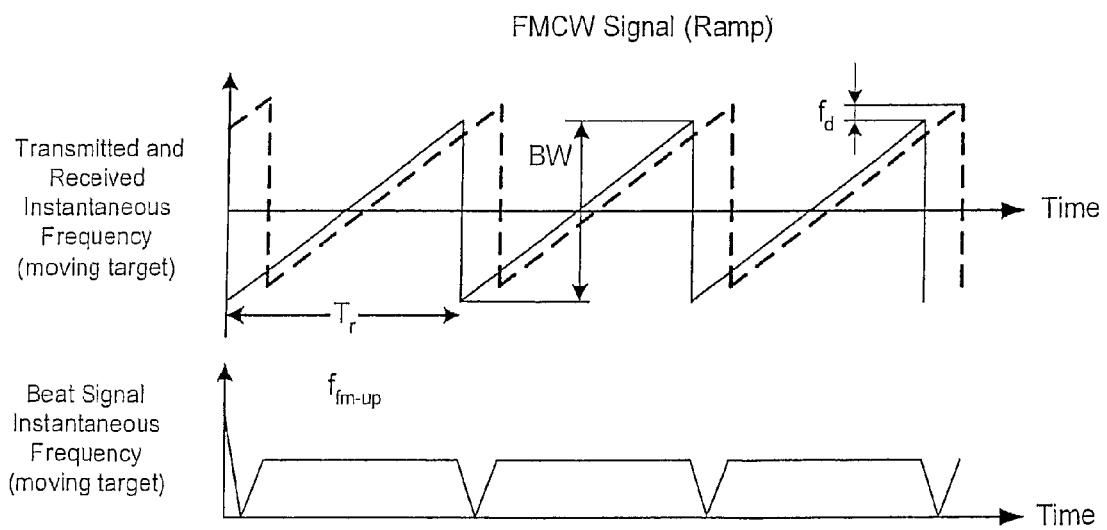

FIGS. 4a and 4b are graphs showing relations between waves transmitted and received by the radar system 110, 120 and beat signals for a static target, see FIG. 4a, and a moving target, see FIG. 4b, when the transmitted signal is a ramp modulated FW-CW radar signal. For the moving target or object of FIG. 4b there is a Doppler frequency as indicated by $f_d$ and the frequency of the up-ramp beat signal $f_{fm-up}$ is changed in accordance with the Doppler frequency $f_d$. In FIGS. 4a and 4b the bandwidth of the FM-CW signal is indicated by BW and the repetition period is indicated by $T_r$.

Figure 5A:
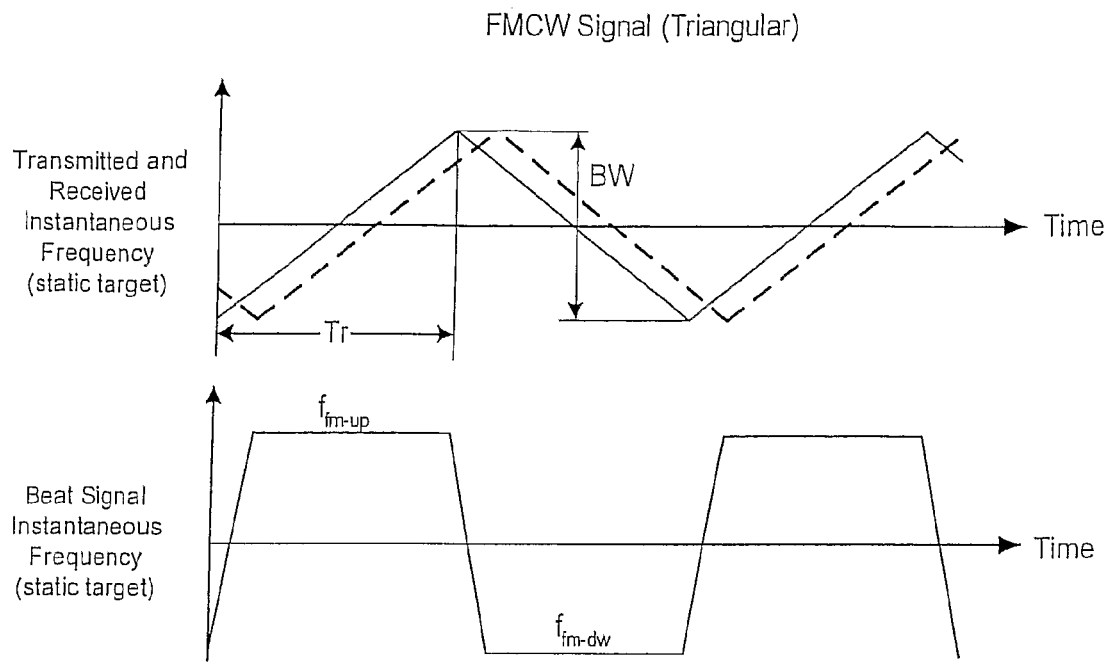
FIGS. 5a and 5b are graphs showing relations between waves transmitted and received by a radar system and beat signals for a static target and a moving target, when the transmitted signal is a triangular modulated FW-CW radar signal.
Figure 5B:
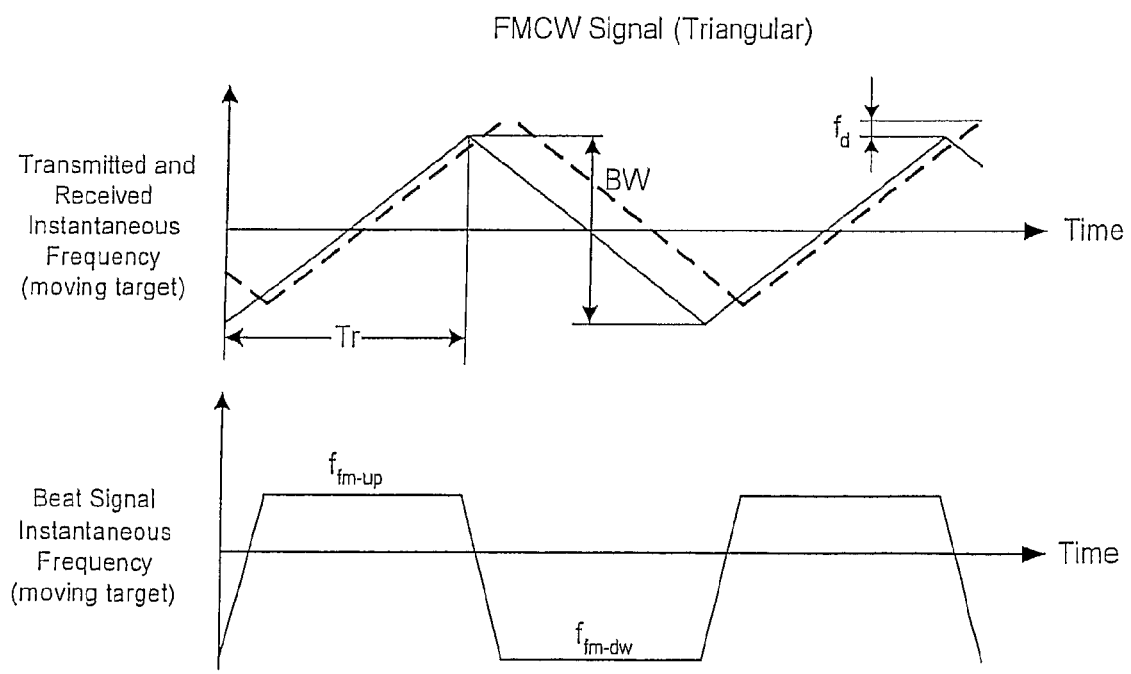

FIGS. 5a and 5b are graphs showing relations between waves transmitted and received by the radar system 110, 120 and beat signals for a static target, see FIG. 5a, and a moving target, see FIG. 5b, when the transmitted signal is a triangular modulated FW-CW radar signal. For the moving target or object of FIG. 5b there is a Doppler frequency as indicated by $f_d$ and the frequency of the up-ramp beat signal $f_{fm-up}$ is lowered in accordance with the Doppler frequency $f_d$, while the frequency of the down-ramp beat signal $f_{fm-dw}$ is increased in accordance with the Doppler frequency. In FIGS. 5a and 5b the bandwidth of the FM-CW signal is indicated by BW and the up-ramp period, which is equal to the down-ramp period, is indicated by $T_r$.

When a single target or object is detected, a single frequency component of the beat signal appears for the CW signal and a single frequency component of the beat signal appears for each of the frequency rising and frequency falling ranges of the FM-CW signal. However, when a plurality of objects are detected, beat signal frequency components of a number equal to the number of objects appear for the CW signal and for both the frequency rising and frequency falling ranges of the FM-CW signal.

Figure 6A:
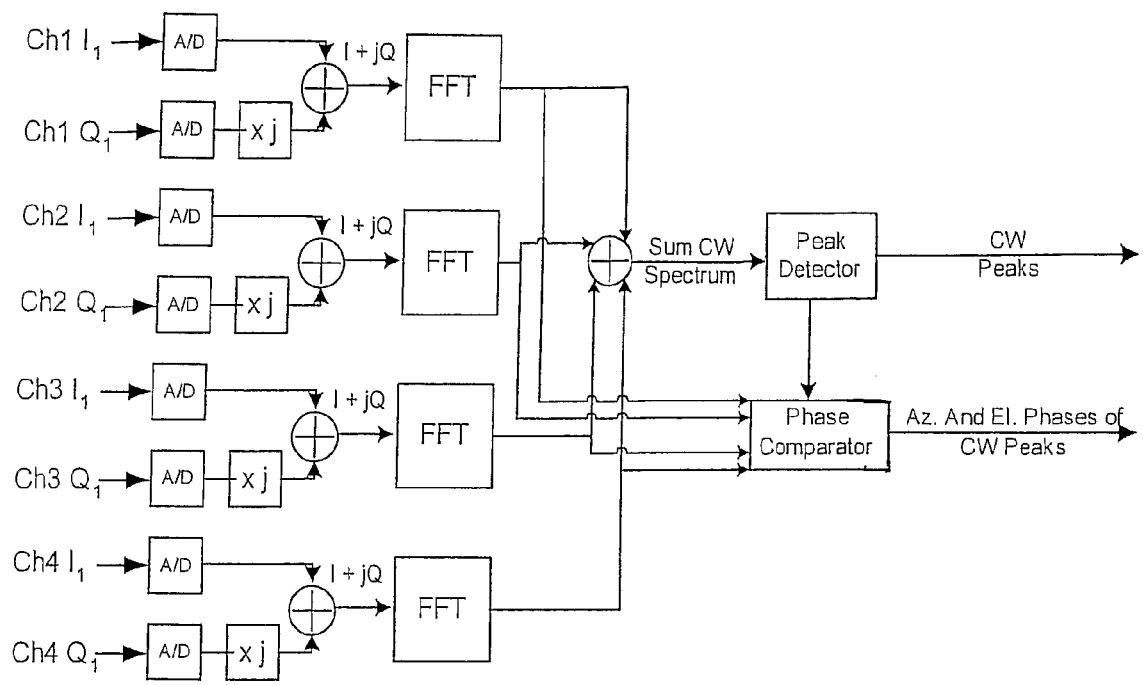
FIGS. 6a, and 6b are block diagrams illustrating the processing of received radar signals using a radar system with 4 receive antennas according to an embodiment of the present invention.
Figure 6B:
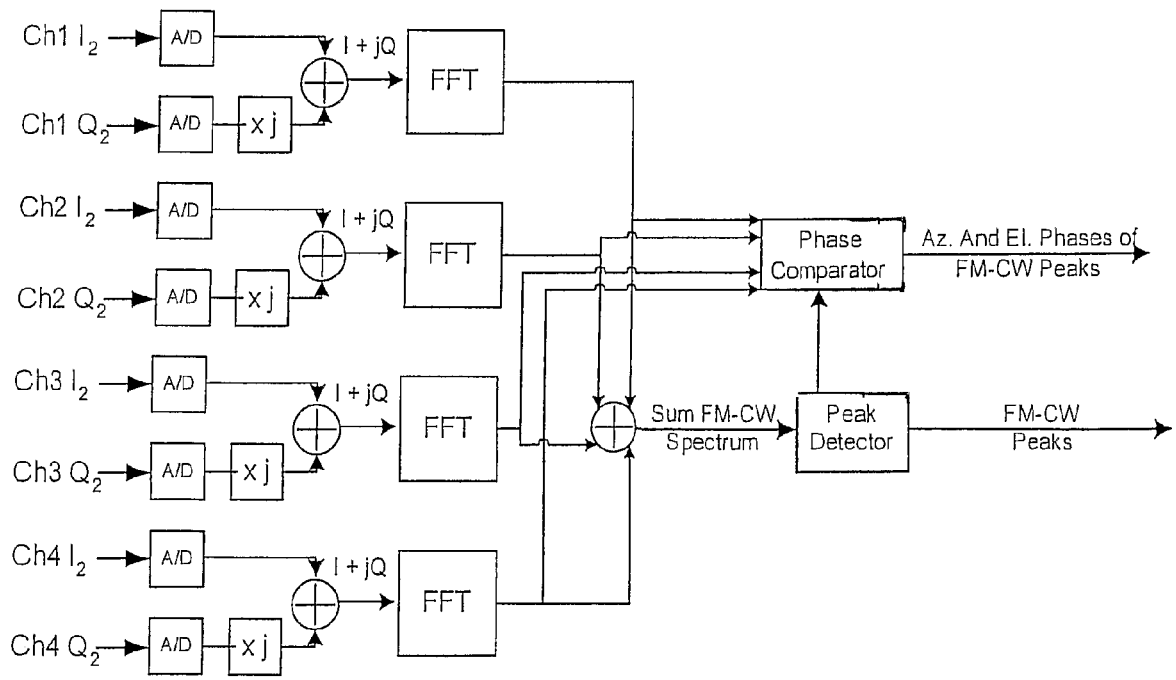

FIGS. 6a, and 6b are block diagrams illustrating the processing of received radar signals using a radar system with 4 receive antennas and 4 corresponding receiver channels, with the 4 antennas being arranged as illustrated in FIG. 2. In FIG. 6a, the signals Ch1 $I_1$ and Ch1 $Q_1$ are the I1 and Q1 outputs from the first receiver channel, having frequency components corresponding to beat signals resulting from the frequency difference between the transmitted CW signal and reflected CW signals received by the first radar signal receiver. In the same way, the signals Ch2 $I_1$ and Ch2 $Q_1$ are the I1 and Q1 outputs from the second receiver channel, the signals Ch3 $I_1$ and Ch3 $Q_1$ are the I1 and Q1 outputs from the third receiver channel, and the signals Ch4 $I_1$ and Ch4 $Q_1$ are the I1 and Q1 outputs from the fourth receiver channel. Each signals of the 4 pairs of I1 and Q1 signals are digitised by corresponding A/D converters, and the digitised Q1 signal is brought on the imaginary form jQ1 by a corresponding "xj" multiplication unit. Each pair of corresponding digital I1 and jQ1 signals are summed via a summation unit, and a FFT (Fast Fourier Transform) is performed on each of the 4 summed I1+jQ1 signals, to thereby obtain 4 corresponding FFT signal outputs. These 4 FFT outputs are summed, and the summed FFT signal, which contains information of summed CW Doppler frequency shifts, is fed to a peak detector. The output of the peak detector, which corresponds to the frequency peaks of the CW beat signals, is stored in a storage unit.

Using the above given equation (8), a CW peak object velocity can be determined and stored for each stored CW peak frequency.

Figure 8:
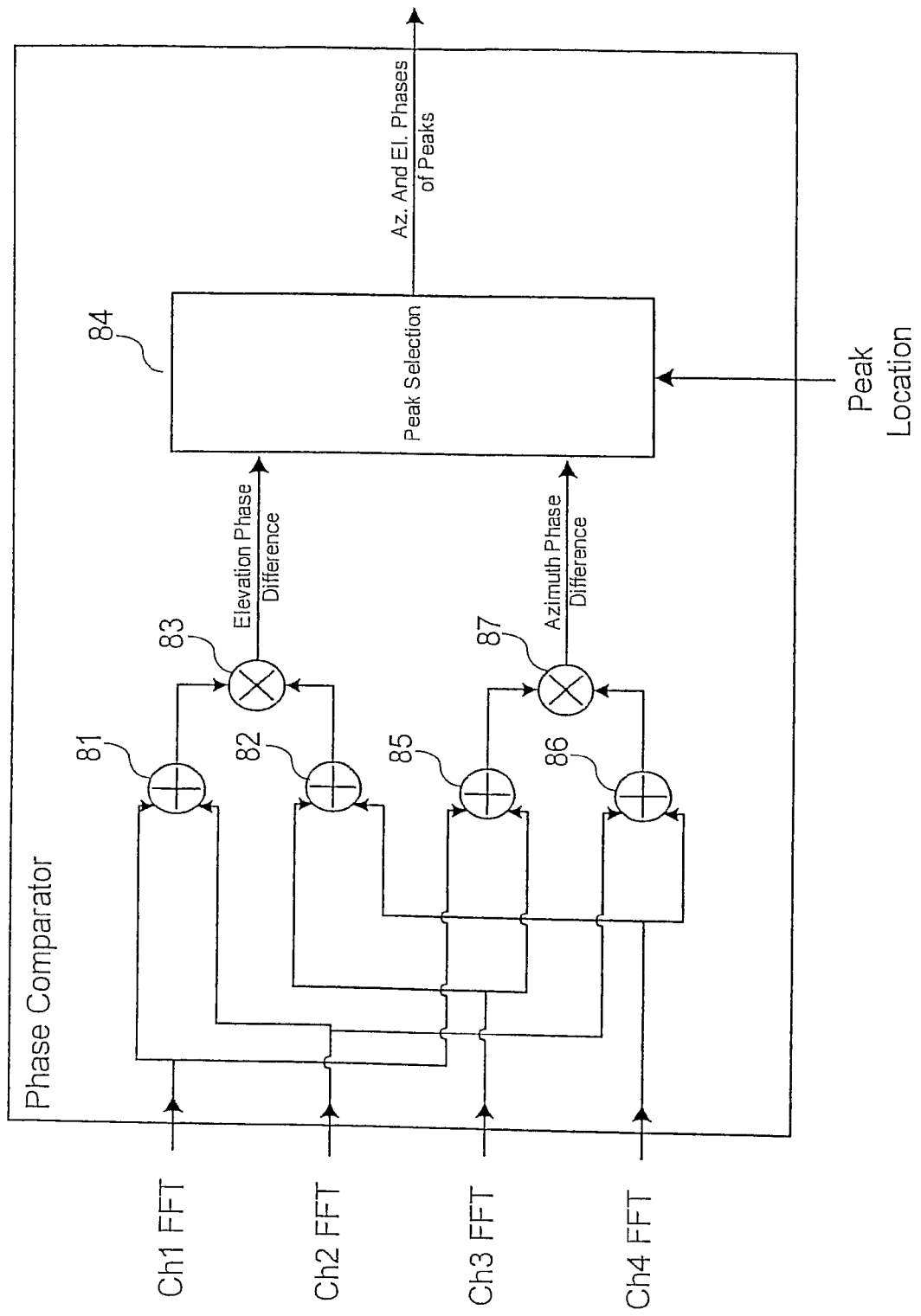
FIG. 8 illustrates a phase comparator for determining elevation and azimuth phase differences from received radar signals according to an embodiment of the present invention.

The 4 FFT outputs for the CW radar signals are further fed into a phase comparator, see FIG. 8, in order to determine azimuth and elevation phase differences from the radar signals received by the 4 receive antennas corresponding to the detected and stored CW frequency peaks.

Similar to the CW signal processing illustrated in FIG. 6a, the processing of the received FM-CW radar signals is illustrated in FIG. 6b. In FIG. 6b, signals Ch1 $I_2$ and Ch1 $Q_2$ are the I2 and Q2 outputs from the first receiver channel, having frequency components corresponding to beat signals resulting from the frequency difference between the transmitted FM-CW signal and reflected FM-CW signals received by the first radar signal receiver. In the same way, the signals Ch2 $I_2$ and Ch2 $Q_2$ are the I2 and Q2 outputs from the second receiver channel, the signals Ch3 $I_2$ and Ch3 $Q_2$ are the I2 and Q2 outputs from the third receiver channel, and the signals Ch4 $I_2$ and Ch4 $Q_2$ are the I2 and Q2 outputs from the fourth receiver channel. Each signals of the 4 pairs of I2 and Q2 signals are digitised by corresponding A/D converters, and the digitised Q2 signal is brought on the imaginary form jQ2 by a corresponding "xj" multiplication unit. Each pair of corresponding digital I2 and jQ2 signals are summed via a summation unit, and a FFT (Fast Fourier Transform) is performed on each of the 4 summed I2+jQ2 signals, to thereby obtain 4 corresponding FFT signal outputs. These 4 FFT outputs are summed, and the summed FFT signal, which contains information of summed FM-CW Doppler frequency shifts, is fed to a peak detector. Also here, the output of the peak detector, which corresponds to the frequency peaks of the FM-CW beat signals, is stored in a storage unit.

Again, the 4 FFT outputs for the FM-CW radar signals are further fed into a phase comparator in order to determine azimuth and elevation phase differences from the radar signals received by the 4 receive antennas corresponding to the detected and stored FM-CW frequency peaks.

Figure 7A:
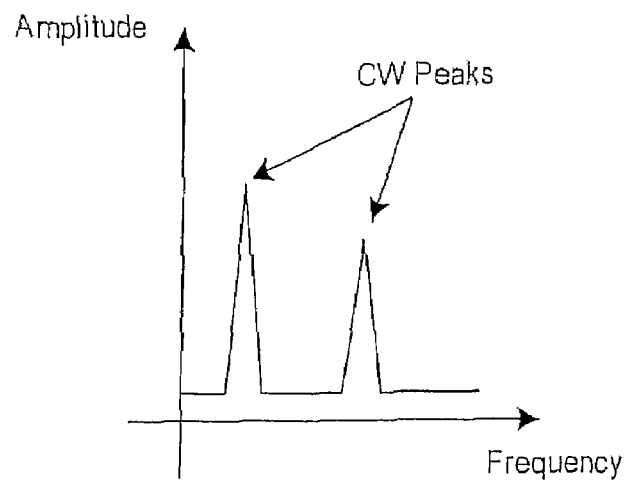
FIGS. 7a and 7b illustrate peak frequencies for received CW signals and FM-CW signals obtained by the processing illustrated in FIG. 6.
Figure 7B:
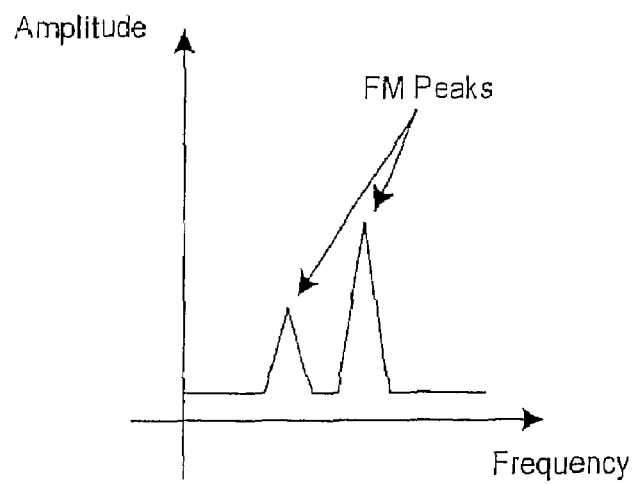

In FIG. 7a are shown peak frequencies corresponding to received CW signals, while in FIG. 7b peak frequencies corresponding to received FM-CW signals are shown.

The operation of the phase comparator of FIGS. 6a and 6b is illustrated in FIG. 8. Here, the outputs of the 4 FFT channels are denoted Ch1 FFT, Ch2 FFT, Ch3 FFT and Ch4 FFT, respectively. The Ch1 FFT and Ch2 FFT signals are summed 81, with the summed signal providing a first input to an elevation phase comparator 83, and the Ch3 FFT and Ch4 FFT signals are summed 82, thereby providing a second input to the elevation phase comparator 83. The comparator subtracts the arguments of the added FFT results of each input corresponding to the same frequency bin, and obtains for each frequency a phase difference which is related to the measured angle of incidence in elevation of each received signal according to equation (9) (being the distance between the two antenna sets along the vertical axis whose outputs are summed). The output of the elevation phase comparator is fed to a peak selection unit 84, which further has as input the frequency location of the corresponding CW peaks or FM-CW peaks. From the unit 84 elevation phase differences corresponding to the frequencies, for which a peak has been detected, are being outputted, which elevation phase differences are then stored in a storage unit. In the same way, the Ch1 FFT and Ch3 FFT signals are summed 85, with the summed signal providing a first input to an azimuth phase comparator 87, and the Ch2 FFT and Ch4 FFT signals are summed 86, thereby providing a second input to the azimuth phase comparator 87. The comparator subtracts the arguments of the added FFT results of each input corresponding to the same frequency bin, and obtains for each frequency a phase difference which is related to the measured angle of incidence in azimuth of each received signal according to equation (9) (being the distance between the two antenna sets along the horizontal axis whose outputs are summed). The output of the azimuth phase comparator is also fed to the peak selection unit 84, from which unit 84 elevation phase differences corresponding to the detected peak frequencies are being outputted to be stored in a storage unit.

From the signal processing illustrated in FIGS. 6a, 6b and 8, stored values are obtained for the CW peak signals and the corresponding CW object velocities and CW elevation and azimuth phase differences. Stored values are also obtained for the FM-CW peak signals and the corresponding elevation and azimuth phase differences. However, the range of or distance to detected objects still needs to be determined.

One method of determining the object range R when transmitting a triangular shaped FM-CW waveform is illustrated in FIG. 9. In FIG. 9 is shown a velocity table, which on the horizontal scale has peak frequencies $f_{fm-up}$ corresponding to the FM-CW up-ramp frequencies, and on the vertical scale has peak frequencies $f_{fm-dw}$ corresponding to the FM-CW down-ramp frequencies. For each pair of $f_{fm-upi}$ and $f_{fm-dwi}$ frequencies, a corresponding object velocity $v_{ij}$ is determined by use of equation (4) and stored. The stored velocities $v_{ij}$ are now compared with previously stored CW object velocities. These velocities are calculated as the average of the velocities associated to CW peak frequencies originated during each ramp from the same object or target. When there is a match between a FM-CW velocity $v_{ij}$ and a CW velocity, the up and down ramp peak frequencies $f_{fm-upi}$ and $f_{fm-dwi}$ corresponding to the matched velocity $v_{ij}$, are then regarded as originated by the same target, which is the target giving rise to the matching CW velocity, and the range R and velocity v can be determined by use of equations (5) or (6)/(7), and (8). The determined range R and velocity v are then stored as a merged peak, which summarizes the information from the CW and FM-CW channels relative to that target.

Figure 10:
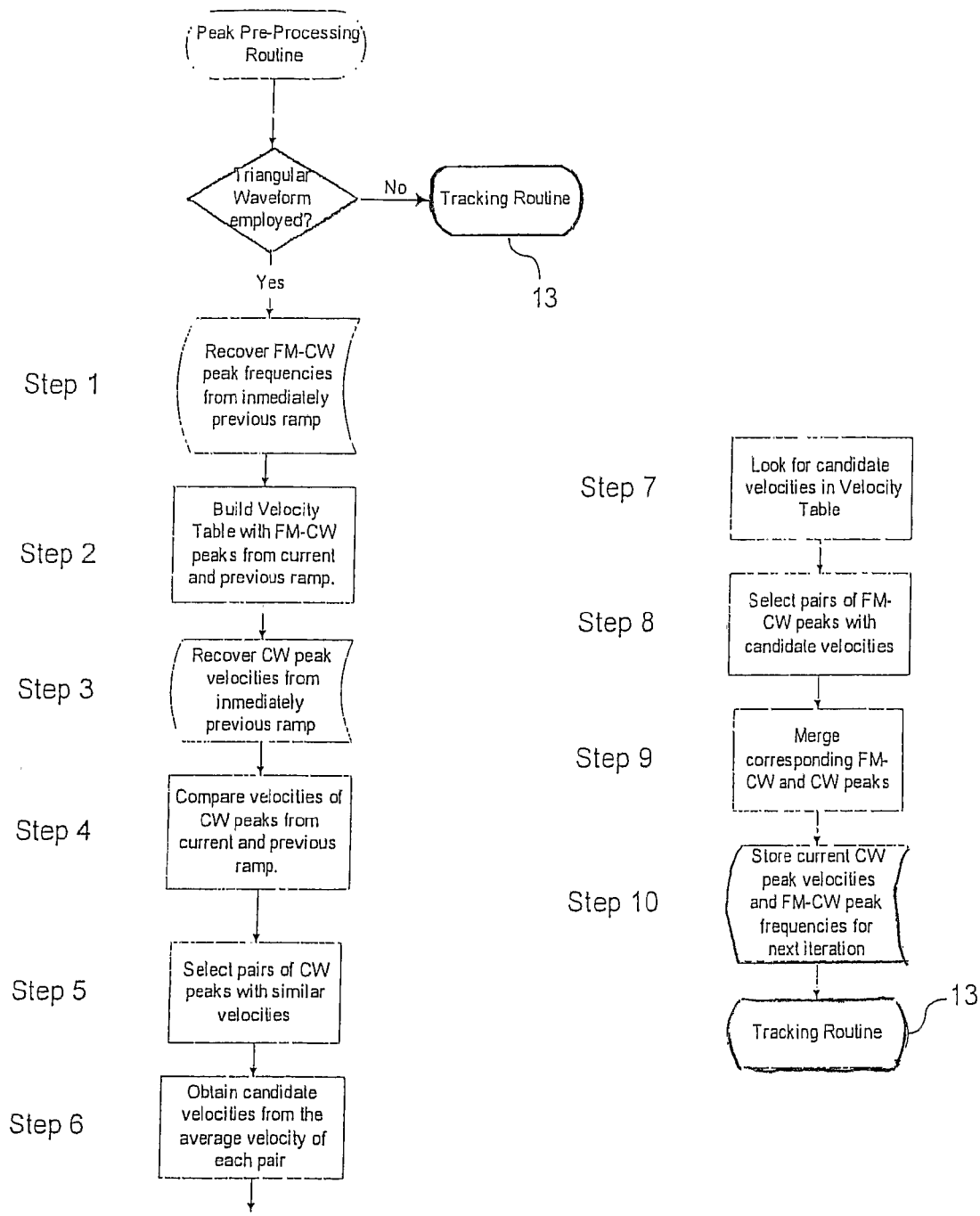
FIG. 10 is a flowchart of a program for determining distances and velocity of radar detected objects for a triangular shaped FM-CW waveform according to an embodiment of the present invention.

The above described method of determining object ranges R for a triangular shaped FM-CW waveform is further illustrated in the flow chart of FIG. 10. It describes a routine, which is intended as a pre-processing step for the peaks originated when a triangular FM-CW waveform is employed before they are sent to a tracking routine 13. Its objective is to provide a solution to the range-velocity ambiguity by making use of the properties of the kind of waveform described by equations (4) through (8). It is assumed that the CW and FM-CW peak frequencies have been detected and stored previously. If a ramp or saw-tooth shaped FM-CW waveform is being used, all peaks are directly sent to the tracking routine 13. In step 1, the FM-CW peak frequencies from the immediately previous ramp (either an up-ramp or a down-ramp) are recovered. Next, in step 2, a velocity table is built based on the frequencies of the FM-CW peaks from the current and immediately previous ramp. For the table to make any sense, the sign of the two ramps must be opposite. In step 3 and 4, the velocities associated to CW peak frequencies detected during the immediately previous ramp are recovered, and compared to the velocities associated to the CW peak frequencies detected during the current ramp. In step 5, velocity pairs are formed with those velocities associated to CW peaks from different ramps, which are sufficiently similar, the similarity criteria being defined by the ramp period and the expected maximum acceleration of the targets. The average of the CW velocities in each pair, step 6, defines a candidate velocity, this is, a velocity, which is assumed to correspond to a firm target. In step 7, the candidate CW velocities are compared with the FM-CW velocities in the velocity table, and, in step 8, pairs of FM-CW and CW peak frequencies corresponding to matched FM-CW and CW velocities are selected. In step 9 corresponding pairs of FM-CW and CW frequency peaks for the current ramp are merged into a single peak with an unambiguous velocity and range calculated by making use of equations (6)/(7), depending on the sign of the current ramp, and equation (8). Finally, step 10, the current CW and FM-CW peak frequencies are stored for the next iteration and sent to the tracking routine 13 together with the merged peaks (which substitute the original pair of CW and FM-CW peaks and will not be used by the tracking routine).

Figure 11:
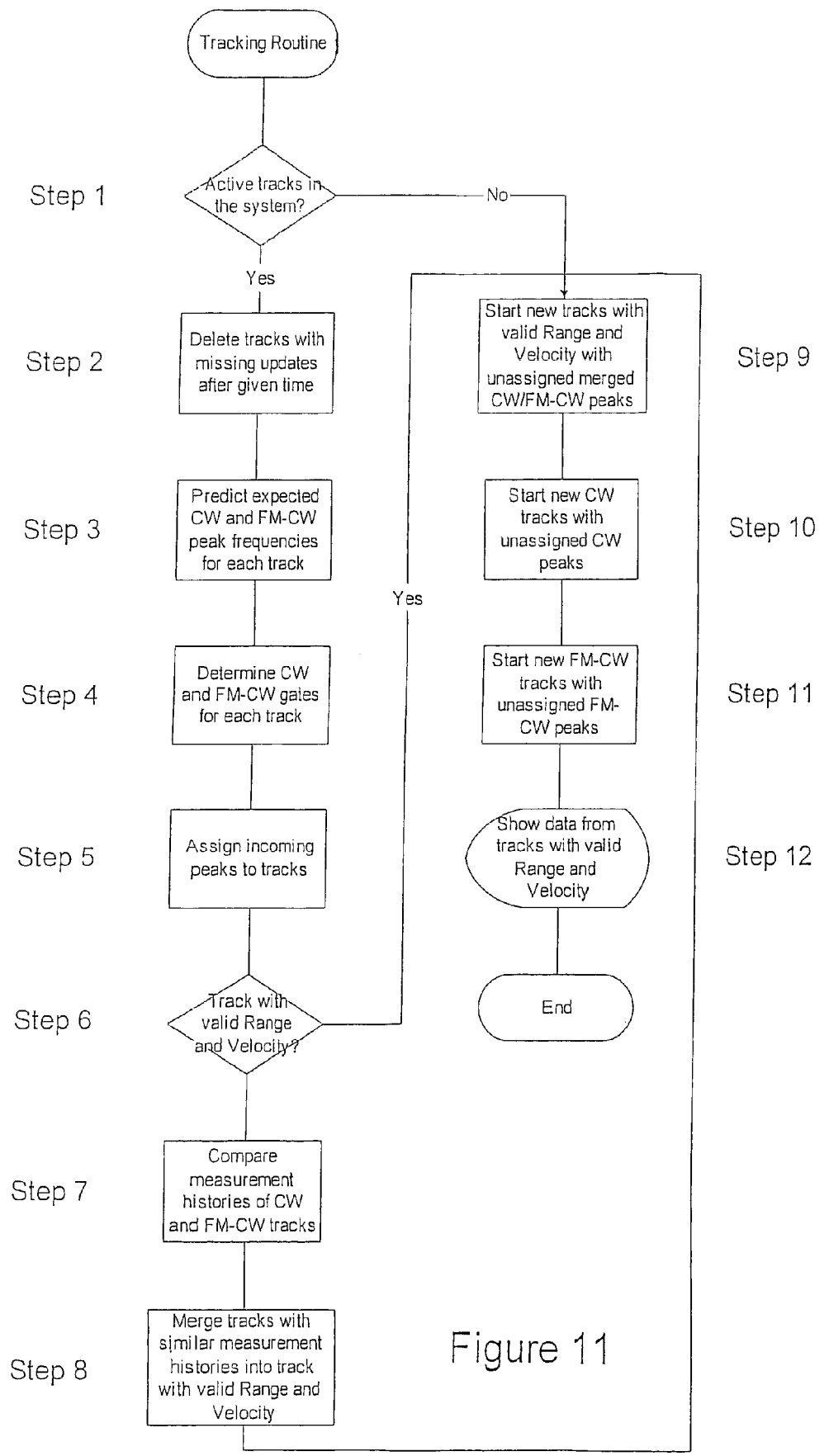
FIG. 11 is a flowchart illustrating a routine for obtaining a track record for radar detected objects holding information of detected CW and FM-CW peak frequencies and detected azimuth and elevation phase differences.

FIG. 11 is a flowchart illustrating a tracking routine corresponding to the tracking routine 13 of FIG. 10. The routine of FIG. 11 is in charge of obtaining track records for radar detected objects, with the records holding the history of range, velocity, azimuth and elevation measurements provided by the CW and FM-CW peaks assigned to each track, as determined by the routine. The routine takes as input data the last set of peaks extracted by the previous stages of the processing system. It starts by checking, step 1, whether there are currently track records being maintained by the routine, corresponding to objects being tracked by the radar. If this is the case, step 2, it is determined for each track record how long time has elapsed since the track last received a measurement update. If that time is longer than a predefined deletion time, typically a few seconds, the track record is no longer regarded as representing a real object being tracked by the system, and it is removed from the list of active track records maintained by the routine.

For each of the remaining tracks, step 4, the values of the frequencies, where the next CW and FM-CW peaks to be assigned to the track record are expected to appear, are calculated. This calculation is made on the basis of the history of measurements previously received by the track by means of a Kalman filter or any other estimation procedure. As a result of the estimation procedure, a centre value for each of the expected frequencies is obtained together with an expected accuracy. The estimated centre frequencies and their associated accuracies are used to construct peak association gates of each active track. Each gate defines the interval of CW or FM-CW peak frequencies where the next peaks to be assigned to a track are expected to appear. As a result of the estimation procedure, each track will be given up to two association gates, one for the expected CW peak frequency and the other one for the expected FM-CW peak frequency.

In the preferred embodiment of the invention Kalman filters are employed as means to improve the accuracy of the velocity and range estimation and permit calculation of the velocity and range association gates. A Kalman filter is defined by the following elements:

- A state vector $x(t)$, which contains the values of the magnitudes to be estimated (range, velocity and their derivatives) at an instant t.
- A covariance matrix $P(t)$, which describes the estimated covariance of the estimates contained in the state vector at an instant t.
- A propagation matrix $\Phi(\Delta T)$, which serves to estimate the values of the state vector after a given time $\Delta T$.
- A measurement vector z, which represents the input measured magnitudes from which the estimates of the Kalman filter are extracted (the measured CW and FM-CW frequencies).
- A measurement matrix H, which relates the expected measured magnitudes to a given value of the state vector.
- A measurement error covariance R which represents the expected mean square errors of the measured frequencies.
- A measurement covariance S which represents the final covariance of the estimated measured frequencies in z.

Given the state vector corresponding to a track record at a determined instant t, the expected values of the state vector after a time $\Delta T$ are calculated as:

$$x(t+\Delta T^-)=\Phi(\Delta T) \cdot x(t) \qquad (10)$$

where the superscript $^-$ indicates that the estimated values of the state vector are calculated before the addition of the possible new measurements incorporated to the track record at time $t+\Delta T$. The estimated covariance of the propagated state vector is calculated as:

$$P(t+\Delta T^-)=\Phi(\Delta T) \cdot P(t) \cdot \Phi^T(\Delta T) \qquad (11)$$

where the superscript $^T$ denotes matrix transposition. From the propagated state vector, the values of the expected measured magnitudes and their covariance are estimated as:

$$z(t+\Delta T^-)=H \cdot x(t+\Delta T^-)$$

$$S(t+\Delta T^-)=H \cdot P(t+\Delta T^-) \cdot H^T + R \qquad (12)$$

The diagonal of the covariance matrix S contains the expected variance of the estimated frequencies and are used to define the range of frequency values which the corresponding association gate will cover. Being $z_1$ the first element of the measurement vector z, and $S_{11}$ the first element of the diagonal of S (the expected variance of the measurement $z_1$), the range of frequencies that must be covered by the association gate will be:

$$(z_1-k\cdot\sqrt{S_{11}}, z_1+k\cdot\sqrt{S_{11}}) \qquad (13)$$

where k will take the value 2.6 if measurement is to be found inside the gate with a 99% probability when a Gaussian distribution is assumed for the estimated variable. If a new measurement is found inside the association gate, it will be incorporated to the current state of the filter by use of:

$$x(t+\Delta T)=x(t+\Delta T^-)+P(t+\Delta T^-) \cdot H^T \cdot S^{-1} \cdot (m-H \cdot x(t+\Delta T^-))$$

$$P(t+\Delta T)=P(t+\Delta T^-)-P(t+\Delta T^-) \cdot H^T \cdot S^{-1} \cdot H \cdot P(t+\Delta T^-) \qquad (14)$$

where m represents the vector containing the newly found peak frequencies which are incorporated to the track record and which serves to update the estimates contained by the state vector.

When only CW peak frequencies are available, the state vector can only consist of the radial velocity of the object and its radial acceleration, while the measurement vector will only contain the expected CW peak frequency. In this case, the form of the necessary propagation and measurement matrix will be:

$$\Phi(\Delta T) = \begin{bmatrix} 1 & \Delta T \\ 0 & 1 \end{bmatrix} \qquad (15)$$

$$H = \begin{bmatrix} \frac{2}{\lambda_{CW}} & 0 \end{bmatrix}$$

When only FM-CW peak frequencies are available, the state vector can only contain the slant range to the object and its radial velocity. In this case, the measurement vector will consist of the expected FM-CW peak frequency and the propagation and measurement matrixes will be of the form:

$$\Phi(\Delta T) = \begin{bmatrix} 1 & \Delta T \\ 0 & 1 \end{bmatrix} \qquad (16)$$

$$H = \begin{bmatrix} \pm\frac{2}{c} \cdot \frac{BW}{T_r} & \frac{2}{\lambda_{FM}} \end{bmatrix}$$

where the sign of the first element of H will be that corresponding to the sign of the next transmitted frequency ramp, according to equations (2) and (3).

When both CW and FM-CW peak frequencies are available, the state vector can represent the slant range, radial velocity and radial acceleration of the object. The measurement vector will contain both the expected CW and FM-CW peak frequencies and the propagation and measurement matrixes become:

$$\Phi(\Delta T) = \begin{bmatrix} 1 & \Delta T & \Delta T^2/2 \\ 0 & 1 & \Delta T \\ 0 & 0 & 1 \end{bmatrix} \qquad (17)$$

$$H = \begin{bmatrix} \pm\frac{2}{c} \cdot \frac{BW}{T_r} & \frac{2}{\lambda_{FM}} & 0 \\ 0 & \frac{2}{\lambda_{CW}} & 0 \end{bmatrix}$$

The centre and aperture of the association gate for the FM-CW peak frequency will respectively be given by the first element of the measurement vector and the first element of the diagonal of the resulting measurement association covariance matrix. The centre and aperture of the association gate for the CW peak frequency will respectively be given by the second element of the measurement vector and the second element of the diagonal of the resulting measurement association covariance matrix.

There will in general be three kinds of track records maintained by the tracking routine: records which have only been assigned CW peaks, records which have only been assigned FM-CW peaks and records which have been assigned both CW and FM-CW peaks. As a result of this, those records with only CW or FM-CW peaks can only be given one association gate corresponding to the next expected CW or FM-CW peak frequency. In general, none of these track records will contain accurate range and velocity measurements since none of their peaks could be associated with the complementary CW or FM-CW peak, which serves to resolve the range-velocity ambiguity. This is especially true when a saw-tooth or ramp shaped FM-CW waveform is employed in the system, since the association procedure described in the flow chart of FIG. 10 cannot be employed. However, if it is taken into account that a real object being observed by the radar will in general give rise to a track record of CW peaks and another one of FM-CW peaks the problem can be circumvented as explained below.

In step 5 of the routine, the CW and FM-CW peaks are assigned to the corresponding tracks according to the location of their association gates. If inside the association gate of a track only one peak appears, the peak and its associated measurements will be assigned that track and the track record updated. If one or more peaks fall into the gates of one or more tracks, the final association of peaks to tracks will have to be determined by means of an additional criterion, such as assigning to each track the peak located closer to the centre of its association gate or similar. Peaks which do not fall into the association gate of any track are later used to initiate new track records, steps 9 to 11, attending to whether they are CW peaks, FM-CW peaks, or peaks resulting from the merging of a CW and FM-CW peak as determined by the algorithm described in the flow chart of FIG. 10. A minimum amount of updates will have to be received by those new tracks in order to be declared as firm tracks.

As indicated previously, track records, which only contain one type of peaks, either CW or FM-CW peaks, can only be given one association gate and therefore only receive an update from the corresponding kind of peak. Track records which consist of both CW and FM-CW are given two association gates and can so be updated by both a CW and a FM-CW. When both classes of peaks are assigned to the track, the unambiguous range and velocity measurements can be derived according to equations (6)/(7) and (8). If only one kind of peak is received by the track, it will still be possible to derive an unambiguous range and velocity measurement for the given iteration by using, as an estimate for the missing peak frequency, the peak frequency employed to build the association gate, which summarizes the past history of CW and FM-CW peak frequencies assigned to the track. By doing so, more robustness and efficient use of the transmitted power can be achieved. At this point, step 6, the updating of the track records containing both CW and FM-CW peaks would be finished.

Regarding those track records consisting of only peaks of one type, the routine will try at any point to find which pair of CW and FM-CW track records is originated from the same object. In order to achieve this, the measurement histories of the track records exclusively consisting of CW peaks will be compared with those of the track records exclusively consisting of FM-CW peaks, step 7. In principle, only the histories of azimuth and elevation measurements, which will be the same if two tracks are generated by same object, can be compared, but depending on the degree of range-velocity coupling existing in the system (which is a function of the parameters of the FM-CW waveform, this is, ramp duration and frequency sweep) it could also be feasible to directly compare the history of velocity measurements of the CW track with that of the FM-CW track derived from the first derivative of its history of peak frequencies.

If according to the above criterion, a pair of track records consisting respectively of only CW and FM-CW peaks is found to correspond to the same object, their track measurements are merged in step 8 in the same fashion as before and a new track record is created with unambiguous range and velocity measurements, which substitutes the previous two. In the next iteration of the algorithm, this new track record will be able to generate both CW and FM-CW association gates and therefore accept both CW and FM-CW peaks.

Once all tracks have been updated, the routine can send the updated measurements of each firm track to another device or algorithm for further processing or presentation to a user, step 12. In principle only information from firm tracks containing both CW and FM-CW peaks will be regarded as valid, since these will be the only ones having accurate unambiguous range and velocity measurements.

While the invention has been particularly shown and described with reference to particular embodiments, it will be understood by those skilled in the art that various changes in form and details may be made therein without departing from the spirit and scope of the invention, and it is intended that such changes come within the scope of the following claims.

The invention claimed is:

1. A radar system for detection of one or more objects, said system comprising:
   a radar wave transmitter for simultaneously transmitting a CW radar signal and a FM-CW radar signal,
   first, second and third radar wave receivers for receiving CW and FM-CW radar signals reflected from one or more objects present in a detection range of the radar system,
   three CW mixers comprising first second and third CW mixers for mixing CW transmission signals and reflected CW signals received by the first, second and third receivers, respectively, to produce one or more corresponding first, second and third CW beat signals, each first, second and third CW beat signal relating to the velocity of an object, and
   three FM-CW mixers comprising first, second and third FM-CW mixers for mixing FM-CW transmission signals and reflected FM-CW signals received by the first, second and third receivers, respectively, to produce one or more corresponding first, second and third FM-CW beat signals, each first, second and third FM-CW beat signal relating to the distance to and the velocity of an object, wherein
   at least two receivers are arranged along a first receiver direction and at least two receivers are arranged along a second receiver direction, said first receiver direction being different to the second receiver direction.

2. A radar system according to claim 1, further comprising means for detecting CW phase differences between corresponding reflected CW radar signals received by at least two different radar wave receivers, and for detecting FM-CW phase differences between corresponding reflected FM-CW radar signals received by said at least two different radar wave receivers.

3. A radar system according to claim 2, wherein the phase detecting means are adapted to determine a first CW phase difference between corresponding reflected CW radar signals and a first FM-CW phase difference between corresponding reflected FM-CW radar signals, said reflected CW and FM-CW radar signals being received by said at least two radar wave receivers arranged along the first receiver direction, and wherein the phase detecting means are adapted to determine a second CW phase difference between corresponding reflected CW radar signals and a second FM-CW phase difference between corresponding reflected FM-CW radar signals, said reflected CW and FM-CW radar signals being received by said at least two radar wave receivers arranged along the second receiver direction, said first phase difference relating to a first object angular direction, and said second phase difference relating to a second object angular direction.

4. A radar system according to claim 3, wherein the phase detecting means are adapted to determine the first CW phase difference from at least two Fourier transformed outputs representing CW signals corresponding to the at least two receivers arranged along the first receiver direction, and to determine the first FM-CW phase difference from at least two Fourier transformed outputs representing FM-CW signals corresponding to the at least two receivers arranged along the second receiver direction and wherein the phase detecting means are adapted to determine the second CW phase difference from at least two Fourier transformed outputs representing CW signals corresponding to the at least two receivers arranged along the second receiver direction, and to determine the second FM-CW phase difference from at least two Fourier transformed outputs representing FM-CW signals corresponding to said at least two receivers arranged along the second receiver direction.

5. A radar system according to claim 1, said radar system further comprising phase detecting means for detecting CW phase differences between corresponding reflected CW radar signals, and for detecting FM-CW phase differences between corresponding reflected FM-CW radar signals, wherein
the phase detecting means are adapted to determine a first CW phase difference between corresponding reflected CW radar signals and a first FM-CW phase difference between corresponding reflected FM-CW radar signals, said reflected CW and FM-CW radar signals being received by said at least two radar wave receivers arranged along the first receiver direction, and said first phase difference relating to a first object angular direction, and
the phase detecting means are adapted to determine a second phase difference between corresponding reflected CW radar signals and a second FM-CW phase difference between corresponding reflected FM-CW radar signals, said reflected CW and FM-CW radar signals being received by said at least two radar wave receivers arranged along the second receiver direction, and said second phase difference relating to a second object angular direction,
said radar system further comprising means for establishing and maintaining one or more CW track records corresponding to one or more objects, each track record comprising a number of detected CW peak frequencies as a function of time and further holding information of first and second angular directions as a function of time determined from measurements of corresponding first and second phase differences, and
said radar system further comprising means for establishing and maintaining one or more FM-CW track records corresponding to one or more objects, each track record comprising a number of detected FM-CW peak frequencies as a function of time and further holding information of first and second angular directions as a function of time determined from measurements of corresponding first and second phase differences.

6. A radar system according to claim 5, further comprising:
a fourth radar wave receiver for receiving reflected CW and FM-CW radar signals,
a fourth CW mixer for mixing CW transmission signals and reflected CW signals received by the fourth receiver to produce one or more fourth CW beat signals, each fourth CW beat signal relating to the velocity of an object, and
a fourth FM-CW mixer for mixing FM-CW transmission signals and reflected FM-CW signals received by the fourth receiver to produce one or more fourth FM-CW beat signals, each fourth FM-CW beat signal relating to the distance to and the velocity of an object.

7. A radar system according to claim 5, wherein for each CW mixer there is corresponding transforming means for taking the Fourier transform of the one or more beat signals from said CW mixer, and for each FM-CW mixer there is corresponding transforming means for taking the Fourier transform of the one or more beat signals from said FM-CW mixer.

8. A radar system according to claim 7, further comprising means for summing the Fourier transformed outputs corresponding to each of said CW mixer and for determining a number of CW peak frequencies from the summed Fourier transformed CW signals, and further comprising means for summing the Fourier transformed outputs corresponding to each of said FM-CW mixer and for determining a number of FM-CW peak frequencies from the summed Fourier transformed FM-CW signals.

9. A radar system according to claim 8, wherein the radar wave transmitter is adapted for transmitting a FM-CW radar signal having a triangular waveform with the frequency being increased at a given first rate and decreased at said first rate, and wherein the radar system comprises:
means for selecting from the determined FM-CW peak frequencies a pair of PM-CW peak frequencies corresponding to consecutive up- and down ramps of the transmitted FM-CW signal,
means for determining a FM-CW object velocity based on the selected pair of FM-CW peak frequencies,
means for comparing the determined FM-CW object velocity with one or more determined CW object velocities to thereby obtain a CW peak frequency corresponding to the selected pair of FM-CW peak frequencies, and
means for determining an object distance from the selected pair of FM-CW peak frequencies or from the corresponding CW peak frequency and at least one of the selected pair of FM-CW peak frequencies.

10. A radar system according to claim 5, wherein the phase detecting means are adapted to determine the first CW phase difference from at least two Fourier transformed outputs representing CW signals corresponding to the at least two receivers arranged along the first receiver direction, and to determine the first FM-CW phase difference from at least two Fourier transformed outputs representing FM-CW signals corresponding to said at least two receivers arranged along the first receiver direction, and wherein the phase detecting means are adapted to determine the second CW phase difference from at least two Fourier transformed outputs representing CW signals corresponding to the at least two receivers arranged along the second receiver direction, and to determine the second phase difference from at least two Fourier transformed outputs representing FM-CW signals corresponding to the at least two receivers arranged along the second receiver direction.

11. A radar system according to claim 5, wherein the first and second receiver directions are perpendicular to each other.

12. A radar system according to claim 5, wherein the phase detecting means are adapted to determine first and second phase differences for Fourier transformed outputs corresponding to a selected CW peak frequency, and for Fourier transformed outputs corresponding to a selected FM-CW peak frequency.

13. A radar system according to claim 5, further comprising means for selecting from the CW track records and the FM-CW track records one or more pairs of CW and FM-CW peak frequencies having corresponding first and second angular directions or corresponding azimuth and elevation angles, and for determining from an obtained pair of CW and FM-CW peak frequencies an object velocity and a corresponding object distance.

14. A radar system according to claim 13, further comprising means for establishing and maintaining one or more track records holding combined CW and FM-CW peak frequency information as a function of time for one or more objects having a velocity and distance determined from a pair of previously measured CW and FM-CW peak frequencies having corresponding velocities.

15. A radar system according to claim 13, further comprising means for establishing and maintaining one or more track records holding combined CW and FM-CW peak frequency information and information of first and second angular directions as a function of time for one or more objects having a velocity and distance determined from a pair of previously measured CW and FM-CW peak frequencies having corresponding first and second angular directions.

16. A radar system according to claim 1, wherein
for each CW mixer there is corresponding transforming means for taking the Fourier transform of the one or more beat signals from said CW mixer, and the radar system further comprises means for summing the Fourier transformed outputs corresponding to each of said CW mixer and for determining a number of CW peak frequencies from the summed Fourier transformed CW signals, and wherein
for each FM-CW mixer there is corresponding transforming means for taking the Fourier transform of the one or more beat signals from said FM-CW mixer, and the radar system further comprises means for summing the Fourier transformed outputs corresponding to each of said FM-CW mixer and for determining a number of FM-CW peak frequencies from the summed Fourier transformed FM-CW signals.

17. A radar system according to claim 16, further comprising:
a fourth radar wave receiver for receiving reflected CW and FM-CW radar signals,
a fourth CW mixer for mixing CW transmission signals and reflected CW signals received by the fourth receiver to produce one or more fourth CW beat signals, each fourth CW beat signal relating to the velocity of art object, and
a fourth FM-CW mixer for mixing FM-CW transmission signals and reflected FM-CW signals received by the fourth receiver to produce one or more fourth FM-CW beat signals, each fourth FM-CW beat signal relating to the distance to and the velocity of an object, wherein
for the fourth CW mixer there is corresponding transforming means for taking the Fourier transform of the one or more beat signals from said fourth CW mixer, and for the fourth FM-CW mixer there is corresponding transforming means for taking the Fourier transform of the one or more beat signals from said fourth FM-CW mixer.

18. A radar system according to claim 1, further comprising:
a fourth radar wave receiver for receiving reflected CW and FM-CW radar signals,
a fourth CW mixer for mixing CW transmission signals and reflected CW signals received by the fourth receiver to produce one or more fourth CW beat signals, each fourth CW beat signal relating to the velocity of an object, and
a fourth FM-CW mixer for mixing FM-CW transmission signals and reflected FM-CW signals received by the fourth receiver to produce one or more fourth FM-CW beat signals, each fourth FM-CW beat signal relating to the distance to and the velocity of an object, wherein
the first and second receivers are arranged horizontally besides each other, the third and fourth receivers are arranged horizontally besides each other, with the third and fourth receivers being arranged vertically below the first and second receivers, respectively, and wherein
for each CW mixer there is corresponding transforming means for taking the Fourier transform of the one or more beat signals from said CW mixer, and
for each FM-CW mixer there is corresponding transforming means for taking the Fourier transform of the one or more beat signals from said FM-CW mixer,
said radar system further comprising means for detecting CW phase differences between corresponding reflected CW radar signals and for detecting FM-CW phase differences between corresponding reflected FM-CW radar signals,
wherein the phase detecting means are adapted to determine an azimuth phase difference between the sum of the two Fourier transformed outputs corresponding to the first and third receivers and the sum of the two Fourier transformed outputs corresponding to the second and fourth receivers, and
wherein the phase detecting means are adapted to determine an elevation phase difference between the sum of the two Fourier transformed outputs corresponding to the first and second receivers and the sum of the two Fourier transformed outputs corresponding to the third and fourth receivers.

19. A radar system according to claim 18, further comprising means for summing the Fourier transformed outputs corresponding to each of said CW mixer and for determining a number of CW peak frequencies from the summed Fourier transformed CW signals, and further comprising means for summing the Fourier transformed outputs corresponding to each of said FM-CW mixer and for determining a number of FM-CW peak frequencies from the summed Fourier transformed FM-CW signals.

20. A radar system according to claim 1, wherein
the radar wave transmitter is adapted for simultaneously transmitting a CW radar signal and a FM-CW radar signal, wherein the FM-CW radar signal is a ramp modulated signal.

21. A radar system according to claim 20, wherein the ramp modulated signal has an up-ramp waveform with an increase in frequency during the up-ramp period or a down-ramp waveform with a decrease in frequency during the down ramp period.

22. A radar system according to claim 1, wherein the radar wave transmitter is adapted for simultaneously transmitting a CW radar signal and a FM-CW radar signal, wherein the FM-CW radar signal has a triangular shaped waveform with up-ramp periods having an increase in frequency and down-ramp periods having a decrease in frequency.

23. A radar system for detection of one or more objects, said system comprising:
a radar wave transmitter for simultaneously transmitting a CW radar signal and a FM-CW radar signal,
first, second and third radar wave receivers for receiving CW and FM-CW radar signals reflected from one or more objects present in a detection range of the radar system,
three CW mixers comprising first, second and third CW mixers for mixing CW transmission signals and reflected CW signals received by the first second and third receivers, respectively, to produce one or more corresponding first, second and third CW beat signals, each first, second and third CW beat signal relating to the velocity of an object, and
three FM-CW mixers comprising first, second and third FM-CW mixers for mixing FM-CW transmission signals and reflected FM-CW signals received by the first, second and third receivers, respectively, to produce one or more corresponding first, second and third FM-CW beat signals, each first, second and third FM-CW beat signal relating to the distance to and the velocity of an object, wherein
at least two receivers are arranged along a first receiver direction and at least two receivers are arranged along a second receiver direction, said first receiver direction being different to the second receiver direction,
said radar system further comprising means for detecting CW phase differences between corresponding reflected CW radar signals and for detecting FM-CW phase differences between corresponding reflected FM-CW radar signals, wherein
the phase detecting means are adapted to determine a first CW phase difference between corresponding reflected CW radar signals and a first FM-CW phase difference between corresponding reflected FM-CW radar signals, said reflected CW and FM-CW radar signals being received by said at least two radar wave receivers arranged along the first receiver direction, said first phase difference relating to a first object angular direction, and
the phase detecting means are adapted to determine a second CW phase difference between corresponding reflected CW radar signals and a second FM-CW phase difference between corresponding reflected FM-CW radar signals, said reflected CW and FM-CW radar signals being received by said at least two radar wave receivers arranged along the second receiver direction, said second phase difference relating to a second object angular direction,
said radar system further comprising means for establishing and maintaining one or more CW track records corresponding to one or more objects, each track record comprising a number of detected CW peak frequencies as a function of time and further holding information of first and second angular directions as a function of time determined from measurements of corresponding first and second phase differences, and
said radar system further comprising means for establishing and maintaining one or more FM-CW track records corresponding to one or more objects, each track record comprising a number of detected FM-CW peak frequencies as a function of time and further holding information of first and second angular directions as a function of time determined from measurements of corresponding first and second phase differences.

24. A radar system for detection of one or more objects, said system comprising:
a radar wave transmitter for simultaneously transmitting a CW radar signal and a FM-CW radar signal,
first, second and third radar wave receivers for receiving CW and FM-CW radar signals reflected from one or more objects present in a detection range of the radar system,
three CW mixers comprising first, second and third CW mixers for mixing CW transmission signals and reflected CW signals received by the first, second and third receivers, respectively, to produce one or more corresponding first, second and third CW beat signals, each first, second and third CW beat signal relating to the velocity of an object, and
three FM-CW mixers comprising first, second and third FM-CW mixers for mixing FM-CW transmission signals and reflected FM-CW signals received by the first, second and third receivers, respectively, to produce one or more corresponding first, second and third FM-CW beat signals, each first, second and third FM-CW beat signal relating to the distance to and the velocity of an object, wherein
at least two receivers are arranged along a first receiver direction and at least two receivers are arranged along a second receiver direction, said first receiver direction being different to the second receiver direction, and wherein
for each CW mixer there is corresponding transforming means for taking the Fourier transform of the one or more beat signals from said CW mixer, and the radar system further comprises means for summing the Fourier transformed outputs corresponding to each of said CW mixer and for determining a number of CW peak frequencies from the summed Fourier transformed CW signals, and wherein
for each FM-CW mixer there is corresponding transforming means for taking the Fourier transform of the one or more beat signals from said FM-CW mixer, and the radar system further comprises means for summing the Fourier transformed outputs corresponding to each of said FM-CW mixer and for determining a number of FM-CW peak frequencies from the summed Fourier transformed FM-CW signals.

25. A radar system for detection of one or more objects, said system comprising:
a radar wave transmitter for simultaneously transmitting a CW radar signal and a FM-CW radar signal,
first, second, third and fourth radar wave receivers for receiving CW and FM-CW radar signals reflected from one or more objects present in a detection range of the radar system,
four CW mixers comprising first, second, third and fourth CW mixers for mixing CW transmission signals and reflected CW signals received by the first second, third and fourth receivers, respectively, to produce one or more corresponding first, second, third and fourth CW beat signals, each first, second, third and fourth CW beat signal relating to the velocity of an object, and four FM-CW mixers comprising first, second, third and fourth FM-CW mixers for mixing FM-CW transmission signals and reflected FM-CW signals received by the first, second, third and fourth receivers, respectively, to produce one or more corresponding first, second, third and fourth FM-CW beat signals, each first, second, third and fourth FM-CW beat signal relating to the distance to and the velocity of an object, wherein the first and second receivers are arranged horizontally besides each other, the third and fourth receivers are arranged horizontally besides each other, with the third and fourth receivers being arranged vertically below the first and second receivers, respectively, and wherein for each CW mixer there is corresponding transforming means for taking the Fourier transform of the one or more beat signals from said CW mixer, and for each FM-CW mixer there is corresponding transforming means for taking the Fourier transform of the one or more beat signals from said FM-CW mixer, said radar system frillier comprising means for detecting CW phase differences between corresponding reflected CW radar signals and for detecting FM-CW phase differences between corresponding reflected FM-CW radar signals, wherein the phase detecting means are adapted to determine an azimuth phase difference between the sum of the two Fourier transformed outputs corresponding to the first and third receivers and the sum of the two Fourier transformed outputs corresponding to the second and fourth receivers, and wherein the phase detecting means are adapted to determine an elevation phase difference between the sum of the two Fourier transformed outputs corresponding to the first and second receivers and the sum of the two Fourier transformed outputs corresponding to the third and fourth receivers.

* * * * *

UNITED STATES PATENT AND TRADEMARK OFFICE
CERTIFICATE OF CORRECTION

PATENT NO. : 7,667,637 B2
APPLICATION NO. : 10/599645
DATED : February 23, 2010
INVENTOR(S) : Pedersen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 540 days.

Signed and Sealed this

Seventh Day of December, 2010

David J. Kappos
*Director of the United States Patent and Trademark Office*